(12) United States Patent
Zummo et al.

(10) Patent No.: US 9,638,559 B1
(45) Date of Patent: May 2, 2017

(54) SYSTEM, DEVICES AND METHODS FOR MEASURING DIFFERENTIAL AND ABSOLUTE PRESSURE UTILIZING TWO MEMS SENSE ELEMENTS

(71) Applicant: Sensata Technologies, Inc., Attleboro, MA (US)

(72) Inventors: Peter Zummo, North Smithfield, RI (US); Victor Bender, North Kingstown, RI (US)

(73) Assignee: Sensata Technologies Inc., Attleboro, MA (US)

( * ) Notice: Subject to any disclaimer, the term of this patent is extended or adjusted under 35 U.S.C. 154(b) by 0 days.

(21) Appl. No.: 15/040,355

(22) Filed: Feb. 10, 2016

(51) Int. Cl.
  *G01F 1/38* (2006.01)
  *G01F 1/88* (2006.01)
  *F02M 26/47* (2016.01)

(52) U.S. Cl.
  CPC ............ *G01F 1/88* (2013.01); *F02M 26/47* (2016.02)

(58) Field of Classification Search
  CPC ... G01F 1/38; G01L 13/02; G01L 9/06; G01L 7/00; G01L 9/12
  USPC ............ 73/861.47, 716, 721, 714, 718
  See application file for complete search history.

(56) References Cited

U.S. PATENT DOCUMENTS

| | | | |
|---|---|---|---|
| 3,691,842 A * | 9/1972 | Akeley | G01L 13/025 73/718 |
| 4,131,088 A | 12/1978 | Reddy | |
| 4,347,745 A | 9/1982 | Singh | |
| 4,984,461 A * | 1/1991 | Haynes | G01F 3/16 73/249 |
| 5,231,301 A | 7/1993 | Peterson | |
| 5,259,248 A | 11/1993 | Ugai et al. | |
| 5,625,151 A | 4/1997 | Yamaguchi | |
| 6,418,793 B1 * | 7/2002 | Pechoux | G01L 9/0072 73/714 |
| 6,473,711 B1 | 10/2002 | Sittler et al. | |
| 6,952,042 B2 | 10/2005 | Stratton | |
| 7,073,375 B2 | 7/2006 | Parker et al. | |
| 7,197,936 B2 | 4/2007 | Baba | |
| 7,270,011 B2 | 9/2007 | Vossenberg | |
| 7,578,194 B1 | 8/2009 | Hadjiloucas | |

(Continued)

FOREIGN PATENT DOCUMENTS

| CN | 103454032 | 12/2013 |
|---|---|---|
| DE | 102004048367 | 4/2006 |

(Continued)

*Primary Examiner* — Jewel V Thompson
(74) *Attorney, Agent, or Firm* — Adler Pollock & Sheehan P.C.; George N. Chaclas; Daniel J. Holmander

(57) ABSTRACT

Featured are systems and methods for measuring differential and absolute pressure of a flowing fluid/gas in a fluid system. In such a method the fluid system is configured with first and second pressure taps that are spaced from each so the second pressure tap is downstream of the first pressure tap in a direction of flow. An absolute pressure sense element and a differential pressure sense element are provided, where the absolute pressure sense element is first fluidly coupled to one of the first or second pressure tap to measure an absolute pressure representative of the flowing fluid/gas. The differential pressure sense element is second fluidly coupled to each of the first and second pressure taps so as to measure a differential pressure of the flowing fluid/gas between the first and second pressure taps.

25 Claims, 14 Drawing Sheets

(56) References Cited

U.S. PATENT DOCUMENTS

| | | |
|---|---|---|
| 7,743,662 B2 | 6/2010 | Kurtz |
| 8,132,464 B2 | 3/2012 | Broden et al. |
| 8,161,820 B2 * | 4/2012 | Yoneda .............. G01L 9/0054 73/715 |
| 8,171,800 B1 | 5/2012 | Chiou |
| 8,215,176 B2 | 7/2012 | Ding et al. |
| 8,234,927 B2 | 8/2012 | Schulte et al. |
| 8,474,322 B1 * | 7/2013 | Shapiro .............. G01F 1/383 73/720 |
| 8,671,765 B2 * | 3/2014 | Tokuda .............. G01L 9/0054 73/700 |
| 2002/0029639 A1 | 3/2002 | Wagner et al. |
| 2004/0020300 A1 | 2/2004 | Boehler et al. |
| 2006/0214202 A1 | 9/2006 | Zorich et al. |
| 2006/0278012 A1 | 12/2006 | Fujimoto |
| 2007/0148788 A1 | 6/2007 | Hsieh |
| 2013/0264664 A1 | 10/2013 | Nimura |
| 2014/0165735 A1 | 6/2014 | Kurtz et al. |
| 2014/0260648 A1 | 9/2014 | Aoyama et al. |

FOREIGN PATENT DOCUMENTS

| | | |
|---|---|---|
| EP | 1074827 | 2/2001 |
| JP | 2010256187 | 11/2010 |
| WO | 9508758 A1 | 3/1995 |
| WO | 2005052535 A1 | 6/2005 |
| WO | WO 2006102460 | 9/2006 |

* cited by examiner

SYSTEM, DEVICES AND METHODS FOR MEASURING DIFFERENTIAL AND ABSOLUTE PRESSURE UTILIZING TWO MEMS SENSE ELEMENTS

FIELD OF INVENTION

The present invention relates to systems, apparatus, devices and methods for measuring differential and absolute pressure. More particularly, the present invention relates to such systems, apparatus, devices and methods that utilize two MEMS sense elements and an oil filed pressure sensor(s). Yet more particularly, the present invention relates to such systems, apparatus, devices and methods that are utilized in combination with a temperature sense element to measure mass flow rate. More specifically, the present invention relates to such systems, apparatus, devices and methods that can be utilized for detecting a pressure and/or flow rate inside an EGR pipe in an EGR system as well as for detecting a pressure and/or flow rate in an intake of an internal combustion engine (e.g., diesel, natural gas).

BACKGROUND OF THE INVENTION

In the automotive industry, numerous efforts have been undertaken over the years to restrict or reduce emissions resulting from the internal combustion process. In particular, emissions of NOx and particulate matters (PM) produced by a diesel engine have been targeted for reduction. One technique that has been contemplated for use, particularly, as a system for reducing NOx is the Exhaust Gas Recirculation (EGR) system.

A known process uses the measured pressures of a flow through a restriction, such as a venturi, throttle, or orifice, to calculate the mass flow of a media through a pipe. Common applications of this process are within the exhaust gas recirculation loop or throttle system in engines. This is typically performed using either: two discrete absolute pressure sensors on opposite sides of the restriction; or a differential pressure sensor across the restriction with a separate absolute pressure sensor on one side. Both of these configurations lead to inherent error in the mass flow calculation by compounding the errors between the two sensors.

Referring now to FIG. 1, there is illustrated a conventional EGR loop design or EGR system for use with an exemplary internal combustion engine, for example a diesel engine. As discussed further below such an EGR system embodies a differential pressure sensor across the restriction with a separate absolute pressure sensor on one side (i.e., the upstream side) for purposes of determining the mass flow rate of the EGR gases. In such an EGR system a part of the exhaust gas is returned to the intake side of the engine to lower the oxygen concentration of the intake gas going to the engine cylinders as well as to reduce the temperature within the cylinders so as to thereby reduce the production of NOx. Also shown is an exemplary fuel delivery system and other mechanism(s) provided for dealing with undesirable exhaust products such as for example, a diesel particulate filter (DPF). The illustrated intake of the exemplary engine also includes a turbine and compressor which are used to turbocharge the intake air being supplied to the engine.

In such an EGR system, it is important to control the return quantity from the exhaust side to the intake side. As indicated above, to measure the EGR mass flow rate, it is customary to dispose an orifice or Venturi (e.g., restriction venturi) inside the EGR pipe and to detect the difference in pressure of the exhaust gas between portions ahead of and behind the orifice or Venturi. The internal construction of the EGR pipe at the connection portion with such a pressure sensor includes an upstream side pressure discharge path for discharging an upstream side pressure P1 of the orifice and a downstream side pressure discharge path for discharging a downstream side pressure P2 of the orifice. As also indicated above, to calculate the mass flow using such a restriction venturi, one measures the following factors the high side absolute pressure, the differential pressure across the venturi and the temperature of the recirculating exhaust temperature or EGR temperature.

Referring now to FIG. 2, there is shown a conventional arrangement for such an EGR loop/system that includes an absolute pressure transmitter (APT) that measure and outputs a signal(s) of the high side absolute pressure, a temperature transmitter (TEMP) that measures and outputs a signal(s) of the EGR temperature; and a module (HCM) that measures and provides an output representative of the differential pressure (high pressure-low pressure) developed across the restriction venturi. As further illustration of such a system and module, reference is herein made to U.S. Pat. No. 7,578,194 (which is commonly owned with the present invention), the teachings of which are incorporated herein by reference. See also the following discussion regarding same.

These outputs representative of the absolute pressure, EGR temperature and differential pressure are provided to the engine control unit or ECU (a unit embodying a digital processing device/mechanism such as a microprocessor, an ASIC, a digital signal processor or the like) which embodies in hardware and/or software a mechanism (e.g., algorithm) for determining the mass flow rate of the exhaust gasses flowing through the EGR pipe (e.g., venturi). Using this information, the ECU can then adjust the flow of exhaust gas being returned to the intake side to an appropriate value. Such an ECU also can be configured and arranged so as to control the operation of the engine or other components of the motor vehicle relating to the engine or engine control (e.g., automatic transmission).

In addition there is found in U.S. Pat. No. 7,578,194, a differential fluid pressure sensor apparatus that includes a housing to which is mounted a sense element module. The sense element module has first and second diaphragm mounting surfaces facing outwardly in a common direction, and a passageway formed in the module and extending between and forming an opening inside each respective diaphragm mounting surface. Also, a respective flexible metal diaphragm is mounted on each diaphragm mounting surface over each opening, and a pressure responsive sense element is disposed in one of the openings of the passageway. A non-compressible fluid fills the passageway and engages the diaphragms and seals therein. Also included are electrical signal conditioning circuitry operatively connected to the pressure responsive sense element, and first and second fluid pressure connection means for presenting respective high and low fluid pressure to the flexible diaphragms for monitoring. As indicated above, such an apparatus is configured for sensing only differential pressure.

Also, it is provided that such solid state pressure sense elements (e.g., piezo resistive pressure sense elements) used for such pressure sensing applications are isolated from the media being sensed by a flexible metal diaphragm robust to the media to protect such sense elements from the harsh makeup of the exhaust gasses. An incompressible fluid or non-compressible fluid, typically silicone oil, is located between the sense element and the diaphragm and is used to transfer pressure from the diaphragm to the sense element. In this way, the sense element can sense and measure the pressure of the media.

There is found in U.S. Pat. No. 7,197,936 a pressure difference (relative pressure) detection type pressure sensor that is fluidly coupled across an orifice disposed in an exhaust gas recirculation (EGR) pipe to detect a pressure difference between portions ahead or upstream of the orifice (high pressure) and behind or downstream of the orifice (low pressure). More particularly, the EGR pipe is configured so as to include an upstream pressure discharge path that provides an upstream side pressure of the orifice and a downstream pressure discharge path that provides a downstream side pressure of the orifice. The upstream and downstream pressure discharge paths are fluidly coupled to the pressure sensor so the pressure sensor can detect or sense the differential pressure. This patent also suggests that the described differential pressure sensor can be applied as a sensor for detecting an intake pressure inside an intake pipe of an engine or an exhaust pressure inside and exhaust pipe. It is further suggested that the sensor also can be disposed in an exhaust pipe to detect a pressure loss of a diesel particulate filter (DPF).

The discussions for the following identified US patents and US patent application Publication illustrate some common themes: differential and absolute sense elements located within one MEMS die; sensors outputting differential and absolute pressure measurements utilizing two absolute sense elements; sensors outputting differential and two absolute pressure measurements utilizing two absolute sense elements; and a system outputting differential and absolute pressure measurements utilizing one differential and one absolute capacitive based deformation sensors mounted to diaphragm plates.

There is found in U.S. Pat. No. 4,131,088 a multiple function pressure sensor for use in combination with an electronic fuel injection system for an internal combustion engine. Such a pressure sensor includes two pressure sensitive elements in a single housing which generate signals indicative of the absolute pressure in the engine's intake manifold and the absolute value of the ambient or atmospheric pressure. Also included is electronic circuitry that subtracts the value of the engine's manifold pressure from the value of the atmospheric pressure and generates a third pressure signal indicative of the difference between the manifold pressure and atmospheric pressure. These three pressure signals are utilized in the electronic fuel injection system for computing the fuel requirements of the engine under various operating conditions.

There is found in U.S. Pat. No. 5,259,248 an integrated multi-sensor or composite sensor which is used in a pressure and differential pressure transmitter for detecting a flow (or the quantity of flow) or a pressure in a chemical plant or the like and also relates to an intelligent differential pressure transmitter and a plant system which use such an integrated multi-sensor. Such an integrated multi-sensor includes a pair of static pressure gages that are formed on a static pressure detecting diaphragm and another pair of static pressure gages that are formed at positions on a fixed portion which are near to the center of a differential pressure detecting diaphragm. By constructing a static pressure sensor so as to form a bridge circuit, a static pressure value free of the influence of a differential pressure can be detected, thereby making it possible to determine an accurate differential and static pressure.

There is found in U.S. Pat. No. 6,473,711 an interchangeable differential, absolute and gage type of pressure transmitter. Such a pressure transmitter includes first and second absolute pressure sensors that receive process pressures from corresponding first and second process inlets. A transmitter circuit coupled to the first and second absolute pressure sensors generates a differential pressure type output. Such a pressure transmitter also includes a third absolute pressure sensor coupled to the circuit, which receives atmospheric pressure from a third inlet. The transmitter circuit generates a second type of transmitter output that can be a gage or absolute pressure type. It is further provided that the transmitter circuit couples to the three absolute pressure sensors, and the transmitter circuit generates differential and non-differential type outputs, such that the transmitter is interchangeably adaptable between differential and non-differential installations.

There is found in U.S. Pat. No. 7,073,375 sensor systems and methods. Such a system embodies an exhaust back pressure sensor using an absolute micro-machined pressure sense die. It is further provided that the core technology to such an exhaust back pressure sensor system is the absolute pressure sensor die. Such a system also includes a sensor's electronic circuit that can incorporate one or more ASICs that process(es) and output(s) the signal for both absolute and differential measurements. Such a sensor can be adapted for use in exhaust gas re-circulation (EGR) systems utilized with automotive gasoline engines. Such a sensor also can be utilized for measuring differential pressure across diesel particular filters and/or applications in which differential pressure is required for system control and/or monitoring purposes. The described absolute pressure sensor can therefore sense the exhaust pressure on automotive engines and other mechanical and/or electromechanical devices and machines.

There is found in U.S. Pat. No. 7,270,011 a micromechanical sensor for measuring at least a first pressure of a first medium and more particularly is a combined absolute-pressure and relative-pressure sensor. Such a micromechanical sensor has at least one substrate having at least two sensor elements. The substrate has at least a first sensor element for measuring an absolute-pres sure variable of the first medium and a second sensor element for measuring a relative-pressure variable of the first medium.

There is found in U.S. Pat. No. 7,743,662 a low differential pressure transducer. Such a pressure transducer includes an H-shaped header having a front and back section, where the front and back sections are of equal diameter and are circular. Each front and back section has a depression with a first and second diaphragm covering the respective depression. Each diaphragm is of equal size and the depressions communicate one with the other via a central channel in the central arm of the H. A pressure sensor communicates with the channel, where the pressure sensor responds to a first pressure applied to the first diaphragm and a second pressure applied to the second diaphragm. The pressure sensor produces an output equal to the difference in the pressure.

There is found in U.S. Pat. No. 8,132,464 a differential pressure transmitter with complimentary dual absolute pressure sensors. It is more particularly provided that such a process variable transmitter for measuring a pressure of a process fluid includes a process coupling having a first port configured to couple to a first process pressure and a second port configured to couple to a second process pressure. A differential pressure sensor is coupled to the first and second ports and provides an output related to a differential pressure between the first pressure and the second pressure. First and second pressure sensors couple to the respective first and second ports and provide outputs related to the first and second pressures. Transmitter circuitry is configured to provide a transmitter output based upon the output from the differential pressure sensor and/or the first and/or second pressure sensors.

There is found in U.S. Pat. No. 8,171,800 a differential pressure sensor using dual backside absolute pressure sensing. A MEMS differential pressure sensing element is provided by two separate silicon dies attached to opposite sides of a silicon or glass spacer, the sides of which are recessed and the recesses formed therein at least partially evacuated. The dies are attached to the spacer using silicon-to-silicon bonding provided in part by silicon oxide layers if a silicon spacer is used. The dies can be also attached to the spacer using anodic bonding if a glass spacer is used.

There is found in U.S. Pat. No. 8,215,176 a pressure sensor for harsh media sensing and flexible packaging; more particularly, a MEMS pressure sensing elements that provide a way for a harsh media absolute pressure sensing and eliminating the negative effects caused by the gel used in the prior art. Such a pressure sensor uses vertical conductive vias to electrically connect the enclosed circuit to the outside, and uses a fusion bond method to attach a cap with the embedded conductive vias over a device die having a circuit for example a piezo resistive Wheatstone bridge to sense pressure. Such a sensor includes a two-pocket housing structure and uses a surface mounting method to attach a sensing element into one pocket by a ball grid array (BGA), and a single pocket structure using conventional die attach and wire bonding. Both can be used for harsh media pressure sensing but without the negative effects caused by the gel in prior art. It is further provided that the sensor is arranged so that diaphragm deflections are caused by a pressure to be measured, where such an embodiment is referred to as an absolute pressure sensor. In an alternate embodiment, the sensor can be configured so it functions as a differential pressure sensor.

There is found in U.S. Pat. No. 8,234,927 a differential pressure sensor with line pressure measurement. More particularly, there is found a pressure sensor assembly for sensing a pressure of a process fluid, such an assembly including a sensor body having a cavity formed therein and first and second openings to the cavity configured to apply first and second pressures. A diaphragm in the cavity separates the first opening from the second opening and is configured to deflect in response to a differential pressure between the first pressure and the second pressure. A capacitance based deformation sensor is provided and configured to sense deformation of the sensor body in response to a line pressure applied to the sensor body.

There is found in U.S. Publication No. 2014/0165735 a differential pressure transducer configured for matching back pressures on differential oil-filled diaphragms. More particularly, such a differential pressure transducer includes first and second diaphragms of different configurations, i.e., different diameters and/or thicknesses. The pressure transducer provides more versatility over prior art designs as the diaphragms can be of different configurations yet still maintain substantially similar back pressures. Therefore, the errors commonly associated with back pressures are eliminated because the back pressures from the diaphragms ultimately cancel out in the sensor's differential pressure measurement.

There is found in WO1995008758 a two-wire transmitter that senses differential pressure, absolute pressure, and process temperature of a process fluid. The information can be used to provide an output representative of mass flow through a pipe. The transmitter has an electronics module housing attached to a sensor module housing.

There is found in WO2005052535 a method and apparatus that integrates differential pressure measurements and absolute pressure measurements to provide virtual absolute pressure measurements over a wide range of pressures on a single integrated scale. To achieve the foregoing objects the method and apparatus for measuring absolute pressure in a chamber includes determining a correlation factor between absolute and differential pressure measurements taken simultaneously at a pressure where the absolute pressure in the chamber can be measured accurately, and adjusting differential pressure measurements with the correlation factor to provide virtual absolute pressure measurements It thus would be desirable to provide a new system, apparatus and methods for determining absolute pressure and differential pressure using two pressure sense elements. It would be particularly desirable to provide such system, apparatus and methods which can be used in combination with other devices to determine mass flow rate of exhaust gas in an EGR application and/or mass flow rate of the intake air. Such systems and apparatus preferably would result in a simpler or less complicated construction as compared to prior art systems and apparatus while maintaining an accuracy comparable to prior art systems/apparatuses. Also such systems and apparatus preferably reduces part count and installation costs as compared to prior art systems/apparatuses particularly when one considers the cost savings associated with the number of engines being produced.

SUMMARY OF THE INVENTION

The present invention in general aspects and/or embodiments features systems, apparatus, devices and methods for measuring differential and absolute pressure. More particularly, such systems, apparatus, devices and methods can be utilized for measuring a pressure and/or flow rate inside an EGR pipe in an EGR system as well as for measuring a pressure and/or flow rate in an intake of an internal combustion engine (e.g., diesel) for automotive applications. Even more particularly, such systems, apparatus, devices and methods utilize two MEMS sense elements and an oil filed pressure sensor(s). Yet more particularly, such systems, apparatus, devices and methods are utilized in combination with a temperature sense element to measure mass flow.

Even more particularly, such systems, apparatus, devices and methods can be utilized in any of a number of applications where pressure (e.g., absolute or differential) is being measured or sensed alone or sensed in combination with another sensing element such as a temperature sensing element. Thus, it should be recognized that the present invention is not limited to applications involving only a combination of pressure sensing and temperature sensing.

It also should be recognized that while the various aspects or embodiments of the present invention as described herein refer to its use in determining flow rate or mass flow rate of a fluid flowing in a fluid system, the present invention is not limited to those specific embodiments, techniques or methodologies described herein. For example, mass flow rate or flow rate can be determined using any of a number of techniques, algorithms, and/or methodologies as are known to those skilled in the art or hereinafter developed. Thus, it is within the scope of the present invention to arrange the pressure sensing capabilities of the present invention to suit such other techniques and the like.

According to one aspect of the present invention, there is featured a method for measuring absolute and differential pressure of a flowing fluid (e.g., gas, liquid) in a fluid system. Such a method includes configuring the fluid system so as to include a first pressure tap and a second pressure tap that are spaced from each other such that the second pressure tap is downstream of the first pressure tap in a direction of the fluid flow. In yet further embodiments, the fluid system is configured so as to embody a piping part, piping section or component that embodies the first and second pressure taps. In more particular aspects/embodiments the flowing fluid is a gas such as that found in the exhaust or intake of a motor vehicle.

Such a method also includes providing an absolute pressure sense element and first fluidly coupling the absolute pressure sense element to one of the first or second pressure taps so as to thereby measure an absolute pressure representative of the flowing fluid at the respective pressure tap to which it is fluidly coupled, and providing a differential pressure sense element and second fluidly coupling the differential pressure sense element to each of the first and second pressure taps so as to measure a differential pressure of the flowing fluid between the first and second pressure taps.

In such a method, such first and second fluidly coupling further includes disposing a non-compressible medium between the respective absolute and differential pressure sense elements and the respective first and second pressure taps. In exemplary embodiments, such a non-compressible medium comprises silicone (e.g., silicone oil). Also, each of the absolute pressure sense element and the differential pressure sense element comprise a MEM sense element.

In further aspects/embodiments of the present invention, such a method includes providing media isolating diaphragms that are disposed between the flowing fluid or fluid media and the non-compressible medium and sense elements so as to isolate the sense elements and the non-compressible medium from the flowing fluid, namely isolating the sense elements from constituents making up a flowing fluid. Such media isolating diaphragms form a pressure barrier to the flowing media and are configured and arranged so as to allow the sense elements to be responsive to the pressure of the flowing fluid (e.g., high and low pressure).

According to an embodiment of the present invention, such first fluidly coupling further includes fluidly coupling the absolute pressure sense element to the first pressure tap so as to thereby measure an absolute pressure representative of the flowing fluid at the first pressure tap location.

According to another embodiment, such a method further includes providing a fluid channel between the second pressure tap and the differential pressure sense element, where the fluid channel contains the non-compressible medium. The fluid channel also is configured and arranged so as to communicate a second pressure representative of the flowing fluid at the second pressure tap location to the differential pressure sense element. Such a method further includes communicating a first pressure representative of the flowing fluid at the first pressure tap location to the differential pressure sense element.

According to yet another embodiment, such a method further includes locating a restrictive pressure device in the fluid system so it is disposed or located between the first and second pressure taps such that the first pressure tap is at a higher pressure than the second pressure tap. Such a restrictive pressure device is one of a restrictive venturi, an orifice, a throttle plate or any of a number of other devices that produce a pressure drop or predetermined pressure drop as fluid flows through the device.

According to yet another embodiment, such a method further includes providing at least one or one digital processing mechanism. The at least one or one digital processing mechanism is configured and arranged for controlling operation of the absolute pressure sense element and for controlling operation of the differential pressure sense element. Such a digital processing mechanism also is configured and arranged for providing an output representative of the absolute pressure being measured and for providing an output representative of the differential pressure being measured. Further, each of the at least one digital processing mechanism or the one digital processing mechanism is an ASIC or other digital processing device such as a microprocessor.

According to yet another embodiment, wherein the at least one digital processing mechanism being provided further includes providing a first digital processing mechanism and a second digital processing mechanism. The first digital processing mechanism is configured and arranged for controlling operation of the absolute pressure sense element and for providing an output representative of the absolute pressure being measured. The second digital processing mechanism is configured and arranged for controlling operation of the differential pressure sense element and for providing an output representative of the differential pressure being measured. Further, each of the first and second digital processing mechanisms is an ASIC or other digital processing device such as a microprocessor.

According to yet another embodiment, such a method further includes providing a temperature sensing device and configuring the fluid system so that the temperature sensing device measures a temperature of the flowing fluid and provides an output of the measured temperature. Also, the absolute pressure sense element provides an output of the measured absolute pressure and the differential pressure sense element provides an output of the measured differential pressure. Such a method further includes using the outputs of the measured temperature, absolute pressure and differential pressure to determine a mass flow rate of the flowing fluid in the fluid system. As indicated herein, in particular embodiments the flowing fluid is a gas such as that found in the exhaust or intake of a motor vehicle.

According to another aspect of the present invention there is featured a method for determining a mass flow rate of a flowing fluid (e.g., liquid, gas) in a fluid system. Such a method includes configuring the fluid system so as to include a first pressure tap, a second pressure tap, a restrictive pressure device and a temperature sensing device. The first and second pressure taps are spaced from each other such that the second pressure tap is downstream of the first pressure tap in a direction of fluid flow and the restrictive pressure device is disposed between the first and second pressure taps such that the first pressure tap is at a higher pressure than the second pressure tap. In yet further embodiments, the fluid system is configured so as to embody a piping part that embodies the first and second pressure taps. As indicated herein, the flowing fluid is a gas such as that found in the exhaust or intake of a motor vehicle. Further the intake gas can include gaseous or atomized fuel.

The temperature sensing device is coupled to and arranged in the fluid system so that the temperature sensing device measures a temperature of the flowing fluid and provides an output of the measured temperature. In more particular illustrative embodiments, the temperature sensing device is located in the fluid system so as to measure a temperature of the flowing fluid one of upstream or downstream of the restrictive pressure device in the direction of flow. In yet further embodiments, the fluid system piping part is further configured with a port or the like to which the temperature sensing device is secured.

Such a method further includes providing an absolute pressure sense element and first fluidly coupling the absolute pressure sense element to one of the first or second pressure taps so as to thereby measure an absolute pressure representative of the flowing fluid at the respective pressure tap to which it is fluidly coupled and providing an output thereof. Also included is providing a differential pressure sense element and second fluidly coupling the differential pressure sense element to each of the first and second pressure taps so as to measure a differential pressure of the flowing fluid between the first and second pressure taps and providing an output thereof. Such first and second fluidly coupling further includes disposing a non-compressible medium between the respective absolute and differential pressure sense elements and the respective first and second pressure taps. In exemplary embodiments, the non-compressible medium comprises a fluid such as silicone oil.

In further aspects/embodiments of the present invention, such a method includes providing media isolating diaphragms that are disposed between the fluid flowing fluid or fluid media and the non-compressible medium and sense elements so as to isolate the sense elements and the non-compressible medium from the flowing fluid, namely isolating the sense elements from constituents making up the flowing fluid. Such media isolating diaphragms form a pressure barrier to the flowing media and are configured and arranged so as to allow the sense elements to be responsive to the pressure of the flowing fluid (e.g., high and low pressure).

Such a method also includes using the outputs of the measured temperature, absolute pressure and differential pressure to determine a mass flow rate of the flowing fluid in the fluid system. In an embodiment of such a method, the flowing fluid is one of an exhaust gas of an exhaust gas recirculation system or intake air of an intake system both of an internal combustion engine.

According to yet another aspect of the present invention there is featured an apparatus for measuring absolute and differential pressure of a flowing fluid (e.g., gas, liquid) in a fluid system. Such an apparatus includes a housing and a sensing module. The housing includes a plurality of cavities that are fluidly coupled in spaced relation to the fluid system and so as to be fluidly coupled to the flowing fluid.

The sensing module is mounted to the housing. Such a sensing module includes an absolute pressure sense element and a differential pressure sense element. The absolute pressure sense element is first fluidly coupled to one of the plurality of cavities so as to thereby measure an absolute pressure representative of the flowing fluid to which the said one cavity is fluidly coupled to. The differential pressure sense element is second fluidly coupled to said one cavity and to another of the plurality of cavities so the differential pressure sense element measures a differential pressure of the flowing fluid to which said first and said another cavities are fluidly coupled to.

Such an apparatus also includes a non-compressible medium (e.g., silicone oil) that is disposed in said one cavity and said another cavity. In this way, the non-compressible medium is located between the respective absolute and differential pressure sense elements and the flowing fluid so as to isolate the sense elements from the flowing fluid (e.g., isolated from constituents making up the flowing fluid) while allowing the sense elements to be responsive to the pressure of the flowing fluid.

In further aspects/embodiments of the present invention, such an apparatus includes media isolating diaphragms that are disposed between the flowing fluid or fluid media and the non-compressible medium and sense elements so as to isolate the sense elements and the non-compressible medium from the flowing fluid, namely isolating the sense elements from constituents making up the flowing fluid. Such media isolating diaphragms form a pressure barrier to the flowing media and are configured and arranged so as to allow the sense elements to be responsive to the pressure of the flowing fluid (e.g., high and low pressure).

In more particular embodiments, each of the absolute pressure sense element and the differential pressure sense element comprise a MEM sense element.

In further embodiments, the sensing module further includes a fluid channel that is arranged so as to be fluidly coupled between said another cavity and the differential pressure sense element, the fluid channel containing the non-compressible medium. The fluid channel is configured and arranged so as to communicate a second pressure representative of the flowing fluid at said another cavity location to one side of the differential pressure sense element.

In further embodiments, the fluid system includes a restrictive pressure device and the housing is configured and arranged so that said one cavity and said another cavity are respectively disposed upstream and downstream of the restrictive pressure device in a direction of the flowing fluid. Also, the restrictive pressure device is one of a restrictive venturi, an orifice or a throttle plate.

In yet further embodiments, such an apparatus includes a first digital processing mechanism and a second digital processing mechanism. The first digital processing mechanism is configured and arranged for controlling operation of the absolute pressure sense element and for providing an output representative of the absolute pressure being measured. More particularly, the first digital processing mechanism includes hardware and/or software that is configured and arranged to control operation of the absolute pressure sense element and to provide an output representative of the absolute pressure being measured.

The second digital processing mechanism is configured and arranged for controlling operation of the differential pressure sense element and for providing an output representative of the differential pressure being measured. More particularly, the second digital processing mechanism is configured and arranged to control operation of the differential pressure sense element and to provide an output representative of the differential pressure being measured. Further, each of the first and second digital processing mechanisms comprise an ASIC or other digital processing device as are known in the art and appropriate for the intended use.

In yet further embodiments, such an apparatus further includes a temperature sensing device that is coupled to the housing so that the temperature sensing device measures a temperature of the flowing fluid. More particularly, a temperature of the flowing fluid that is upstream of the upstream pressure tap or upstream of the restrictive pressure device. Alternatively, the temperature sensing device is coupled to the housing so that the temperature sensing device measures a temperature of the flowing fluid that is downstream of the upstream pressure tap or downstream of the restrictive pressure device. Also, such a temperature sensing device provides an output of the measured temperature. As indicated herein, the flowing fluid is a gas such as that found in the exhaust or intake of a motor vehicle.

As indicated herein, the fluid system is configurable so as to include a piping part, piping section or component that embodies the first and second pressure taps to which the apparatus can be fluidly coupled. More particularly, the plurality of cavities are fluidly coupled to the first and second pressure taps so as to be in spaced relation in the fluid system and so as to be fluidly coupled to the flowing fluid. In yet further embodiments, the piping part, piping section or component is further configured as so as to embody another port for the temperature sensing device as described herein. As described further herein in further embodiments, such a temperature sensing device can be operably coupled to the pressure sensing assembly such that the pressure sensing assembly can transmit signals representative of the absolute pressure, differential pressure and temperature to the ECU.

In further embodiments, such an apparatus includes a third digital processing device; where each of the first and second digital processing mechanisms and the temperature sensing device are operably coupled to a third digital processing device. The third digital processing device is configured and arranged so the outputs of the measured temperature, absolute pressure and differential pressure are used to determine a mass flow rate of the flowing fluid. In illustrative embodiments, the third digital processing device comprises an engine control unit (ECU) or the like which processes signals and/or inputs so as to generally control operation of an internal combustion engine to which it is operably coupled. In yet further embodiments, the third digital processing mechanism comprises and ASIC or other digital processing device (e.g., microprocessor) as is known to those skilled in the art and appropriate for the intended use.

According to yet a further aspect of the present invention there is featured a system for measuring at least absolute and differential pressure of a flowing fluid. Such a systems includes a fluid system portion and a measuring and signal outputting device. Such fluid flows in the fluid system portion and the fluid system portion includes a first pressure tap and a second pressure tap that are spaced from each other such that the second pressure tap is downstream of the first pressure tap in a direction of the fluid flow. The measuring and signal outputting device measures absolute and differential pressure of the flowing fluid in the fluid system portion and provides signal outputs of the measured absolute and differential pressures.

The measuring and signal outputting device includes a housing having a plurality of cavities that are fluidly coupled in spaced relation to the fluid system portion and so as to be fluidly coupled to the flowing fluid and a sensing module mounted to the housing. Such a sensing module includes an absolute pressure sense element that is first fluidly coupled to one of the plurality of cavities so as to thereby measure an absolute pressure representative of the flowing fluid to which the said one cavity is fluidly coupled to. The sensing module also includes a differential pressure sense element that is second fluidly coupled to said one cavity and to another of the plurality of cavities so the differential pressure sense element measures a differential pressure of the flowing fluid to which said first and another cavities are fluidly coupled to. In yet more particular embodiments, each of the absolute pressure sense element and the differential pressure sense element comprise a MEM sense element.

Further, a non-compressible medium is disposed in said one cavity and said another cavity so that the non-compressible medium is located between the respective absolute and differential pressure sense elements and the flowing fluid so as to thereby isolate the sense elements from the flowing fluid while allowing the sense elements to be responsive to the pressure of the flowing fluid. As indicated herein, the fluid includes a liquid or a gas such as the exhaust or intake air of a conventional internal combustion engine fueled by a hydrocarbon such as gasoline, diesel or propane.

In further aspects/embodiments, such a system further includes a signal analysis device. More particularly, the measuring and signal outputting device is operable coupled to a signal analysis device which allows it to provide signal outputs of the measured absolute and differential pressures to the signal analysis device. The signal analysis device is appropriately configured and arranged so that it can process these signal outputs (or signal inputs) and further provide outputs or signals (e.g., control signals or outputs) to system components so as to control functionalities and process parameters (e.g., fluid flow, pressure, etc.) so that the system including associated engine/motor vehicle are operated in the desired fashion.

In more particular aspects/embodiments, the signal analysis device embodies a digital processing device (such as a microprocessor, ASIC or the like) that is configured and arranged to received and process such signal inputs (e.g., outputs of measured temperature, absolute pressure and differential pressure) and to output control signals and/or outputs that are used to control other functionalities of the fluid system. More particularly, such a digital processing device would include (in hardware and/or software) instructions, criteria, code segments to process such signal outputs to determine how the controlled functionalities of the fluid system should be arranged so as to thereby control operation and process parameter(s) of the fluid system and thus for example operation of the internal combustion engine. In more specific aspects/embodiments, the signal analysis device, more specifically the digital processing device thereof, processes these inputs (e.g., outputs of measured temperature, absolute pressure and differential pressure) to determine a mass flow rate of the flowing gas in the fluid system, which in turn can be used to determine how the fluid system functionalities should be controlled.

For example, in the case where the application is exhaust gas recirculation (EGR), the signal analysis device would process the inputs to provide control signals or control outputs to the appropriate EGR system functionalities to control the amount of exhaust gas being recirculated to the intake side of the engine. In the case where the application is the intake air for the engine, the signal analysis device would provide control signal or control outputs to the appropriate intake functionalities (e.g., throttle valve) to control the amount of intake air being provided to the engine. Such a signal analysis device also can receive other inputs or signals from other devices (e.g., fluid temperature, engine speed, throttle inputs from driver (e.g., depression of the acceleration peddle)) for purposes of controlling such functionalities.

In further aspects/embodiments, such a sensing module further includes a fluid channel that is arranged so as to be fluidly coupled between said another cavity and the differential pressure sense element, the fluid channel containing the non-compressible medium. The fluid channel also is configured and arranged so as to communicate a second pressure representative of the flowing fluid at said another cavity location to the differential pressure sense element. In further embodiments, the absolute pressure sensing element and the differential pressure sense element are disposed in said one cavity.

In yet further aspects/embodiments the fluid system portion is arranged so as to include a restrictive pressure device that is disposed between the first and second pressure taps and the measuring and outputting device housing is arranged so that said one cavity and said another cavity are connected to the respective first and second pressure taps so said one cavity and said another cavity are disposed upstream and downstream of the restrictive pressure device in a direction of the flowing gas. In yet further embodiments, the restrictive pressure device is one of a restrictive venturi, an orifice or a throttle plate.

In yet further embodiments, the measuring and outputting device further includes first and second digital processing mechanisms. The first digital processing mechanism is configured and arranged for controlling operation of the absolute pressure sense element and for providing an output representative of the absolute pressure being measured. The second digital processing mechanism is configured and arranged for controlling operation of the differential pressure sense element and for providing an output representative of the differential pressure being measured. In yet further embodiments, each of the first and second digital processing mechanisms comprise an ASIC or other digital processing mechanism as is known to those skilled in the art and appropriate for the intended use. In yet further aspects/embodiments, each of the first and second digital processing devices are operably or communicatively coupled to the signal analysis device digital processing device.

In yet further embodiments, the fluid system portion further includes a temperature sensing device that is arranged in the fluid system portion so that the temperature sensing device measures a temperature of the flowing fluid and so the temperature sensing device provides an output of the measured temperature.

In yet further aspects/embodiments, the temperature sensing device is operably or communicatively coupled to the signal analysis device digital processing device so that measured temperature output(s) are provided to the signal analysis device digital processing device. In further embodiments, the signal analysis device digital processing device is configured and arranged to process the outputs of the measured temperature, absolute pressure and differential pressure and to determine a mass flow rate of the flowing fluid in the fluid system portion.

As indicated herein, a known process to measure pressures of a flowing fluid (e.g., gas, liquid) through a restriction, such as a venturi, throttle, or orifice, and to calculate the mass flow of a media through a pipe, can involve disposing a differential pressure sensor across the restriction with a separate absolute pressure sensor on one side (e.g., upstream side in the direction of flow). As is known to those skilled in the art, such a configuration can lead to inherent error in the mass flow calculation by compounding the errors between the two sensors (i.e., differential and absolute pressure sensors).

In contrast, the present invention at least substantially minimizes if not eliminates the compounded error by incorporating an absolute and differential sensor into one package. In the present invention, an absolute sense element and a differential sense element are mounted within the high side pressure port or tap of a media and the isolated differential sense element is filled with an incompressible fluid. By co-locating these sense elements in the same pressure port or tap, accuracy impacts due to sensor spacing and media connection variation, such as port diameter tolerances, can be eliminated/substantially minimized. Also, incorporating the invention into a sensor which orients the media isolating diaphragms horizontally reduces accumulation of contaminations such as soot or water which could impact sensor accuracy. Further, eliminating one complete sensor port, compared to a configuration using two discrete sensors, also reduces contamination accumulation sites and improves accuracy of the calculated mass flow.

Other aspects and embodiments of the invention are discussed below.

DEFINITIONS

The instant invention is most clearly understood with reference to the following definitions:

USP shall be understood to mean U.S. Pat. No. and U.S. Publication No. shall be understood to mean U.S. Published patent application No.

The terms "comprising" and "including: as used in the discussion directed to the present invention and the claims are used in an open-ended fashion and thus should be interpreted to mean "including, but not limited to." Also the terms "couple" or "couples" is intended to mean either an indirect or direct connection. Thus, if a first component is coupled to a second component, that connection may be through a direct connection, or through an indirect connection via other components, devices and connections. Further the terms "axial" and "axially" generally mean along or substantially parallel to a central or longitudinal axis, while the terms "radial" and "radially" generally mean perpendicular to a central, longitudinal axis.

Additionally directional terms such as "above," "below," "upper," "lower," etc. are used for convenience in referring to the accompanying drawing figures. In general, "above," "upper," "upward" and similar terms refer to a direction toward a proximal end of an instrument, device, apparatus or system and "below," "lower," "downward," and similar terms refer to a direction toward a distal end of an instrument, device, apparatus or system, but is meant foe illustrative purposes only and the terms are not meant to limit the disclosure.

ASIC shall be understood to mean application specific integrated circuit.

PM shall be understood to mean particulate matter(s), particularly particulate matter(s) resulting from the internal combustion process of a diesel engine.

EGR shall be understood to mean or relate generally to exhaust gas recirculation and EGR systems shall be understood to more particularly mean or relate to exhaust gas recirculation systems. In such an EGR system a part of the exhaust gas after being cooled is returned to the intake side (e.g., intake air plenum, intake manifold) so as to lower the oxygen concentration of the air going to the engine cylinders as well as reducing the temperature of the intake air in the engine cylinders so as to reduce NOx.

ECU shall be understood to mean engine control unit or the like.

PEI shall be understood to mean polyetherimide.

A digital processing device or mechanism shall be understood to comprise a microprocessor, application specific integrated circuit (ASIC), a digital signal processor or the like, that embodies in hardware and/or software (e.g., digital program instructions, data, criteria and/or code segments) the functionality to receive and process inputs from a number of components, instruments and/or sensors, including those of a motor vehicle and to provide appropriate outputs such as control outputs to the engine or other components of the vehicle to control operation of the vehicle and/or engine thereof.

BRIEF DESCRIPTION OF THE DRAWING

For a fuller understanding of the nature and desired objects of the present invention, reference is made to the following detailed description taken in conjunction with the accompanying drawing figures wherein like reference character denote corresponding parts throughout the several views and wherein.

DESCRIPTION OF THE PREFERRED EMBODIMENT

Figure 3:
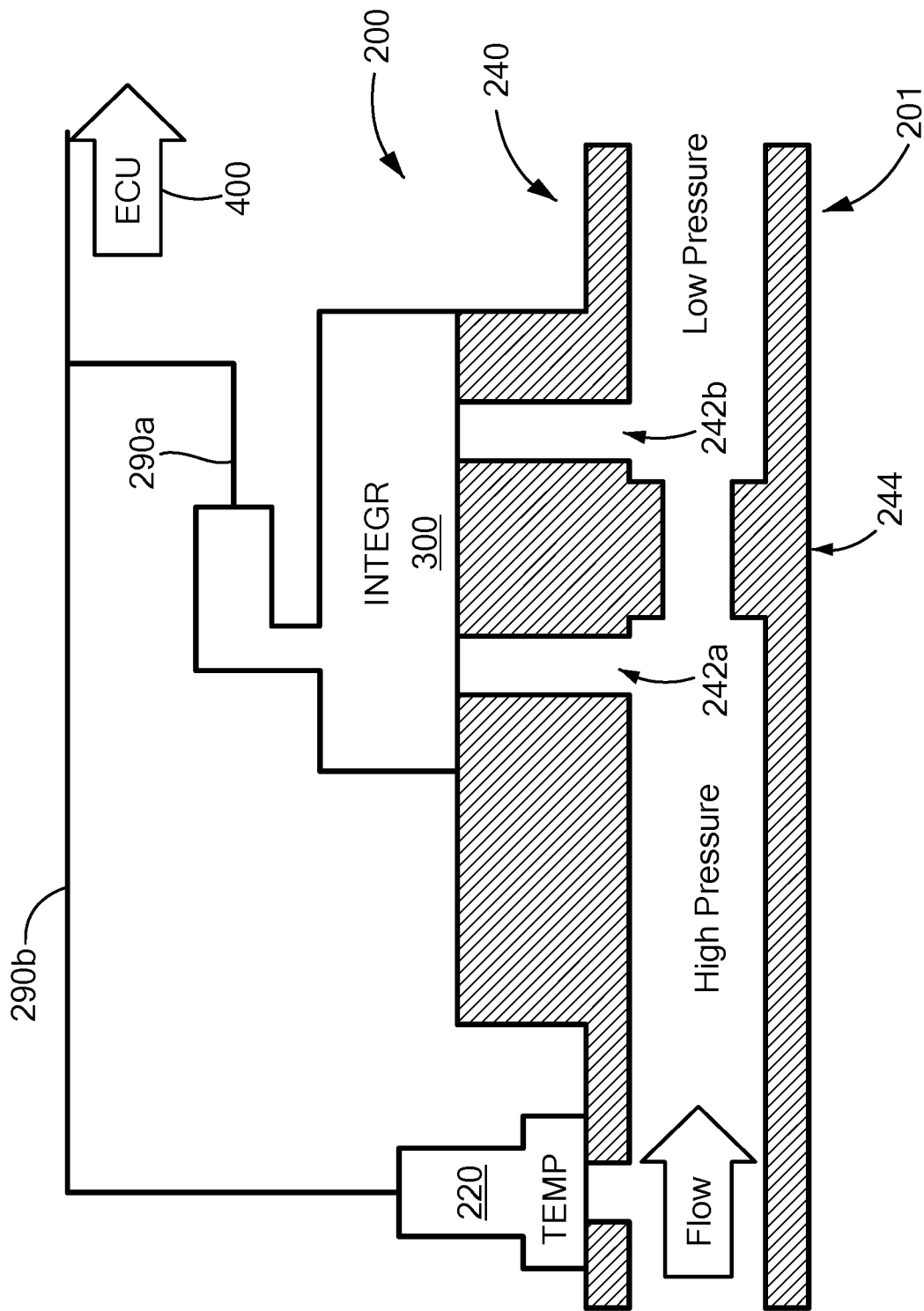
FIG. 3 is a schematic block diagram view of an exemplary integrated exhaust gas recirculation sensing system/assembly according to the present invention.

Referring now to the various figures of the drawing wherein like reference characters refer to like parts, there is shown in FIG. 3 a schematic block diagram view of an exemplary integrated exhaust gas recirculation (EGR) sensing system 200 according to the present invention. Such an EGR sensing system 200 can be located in any EGR system or EGR loop as is known to those skilled in the art such as that shown, for example, in FIG. 1 by appropriate adaptation of the EGR system.

For example, the fluid system or fluid system piping (e.g., EGR piping 240) in which the EGR sensing system 200 is disposed in can be configured and arranged so as to embody the necessary pressure taps or ports 242 a, b so that the EGR sensing system can be appropriately coupled thereto. Alternatively, the fluid system piping can be configured and arranged so as to include a piping section 201, a piping portion or a piping component that are respectively fluidly coupled to the remaining fluid system piping 240 using any of a number of techniques or methods that are appropriate for the intended use/application (e.g., exhaust gas or intake gas), including but not limited to welding, use of bolts and flanges, brazing and clamps. Such a piping section 201, piping portion or piping component also is configurable to embody the pressure taps 242 a, b for coupling to the pressure sensing assembly 300 as described further herein.

While the following describes the use of a pressure sensing assembly 300 according to the present invention in connection with an EGR sensing system 200 or loop as well as for a particular use in determining a mass flow rate, this shall not be considered as limiting as it is within the scope of the present invention to use such a pressure sensing assembly 300 alone or in combination with a temperature sensing element 220 as well as using such a pressure sensing assembly in connection with other functionalities of an engine such as those associated with the intake and/or intake air of an internal combustion engine.

In addition, such systems, apparatus, devices and methods of the present invention can be utilized in any of a number of applications where pressure (e.g., absolute or differential) is being measured or sensed alone or sensed in combination with another sensing element such as a temperature sensing element. Thus, it should be recognized that the present invention is not limited to applications involving only a combination of pressure sensing and temperature sensing.

It also should be recognized that while the various aspects or embodiments of the present invention as described herein refer to its use in determining flow rate or mass flow rate of a fluid flowing in a fluid system, the present invention is not limited to those specific embodiments, techniques or methodologies described herein. For example, mass flow rate or flow rate can be determined using any of a number of techniques, algorithms, and/or methodologies as are known to those skilled in the art or hereinafter developed. Thus, it is within the scope of the present invention to arrange the pressure sensing capabilities of the present invention to suit such other techniques and the like.

The term flowing fluid as used herein includes flowing liquids or gas. In more particular aspects, the flowing gas is that found in the exhaust or intake of a motor vehicle. Further, the flowing gas can include other constituents, for example the intake gas can include gaseous (e.g., propane, natural gas) or atomized fuel (e.g., gasoline) constituents as well as combustion constituents for the exhaust gas.

Such an EGR sensing system 200 is operably and communicatively coupled to an engine control unit (ECU) 400 or the like that is configured and arranged to at least control operation of the internal combustion engine (e.g., diesel engine) to which it is coupled. Such an ECU 400 typically includes hardware and software to perform the intended operational monitoring and control functions. In the case of an EGR application, the ECU 400 receives various inputs from the EGR sensing system 200 that are utilized by the ECU to determine if and how much exhaust gas should be recirculated into the intake of the engine. In the case of an intake air application, the EGR sensing system 200 would be adapted so the resulting system could be used with intake air and related components. The outputs of the resulting sensing system can be used to control the flow of intake air including the intake fuel-air mixture to the engine.

In particular embodiments, the ECU 400 is a digital processing device or mechanism that can embody a microprocessor, application specific integrated circuit (ASIC), a digital signal processor or the like. Such a digital processing device or mechanism further embodies in hardware and/or software (e.g., digital program instructions, data, criteria and/or code segments) the functionality to receive and process inputs from a number of components, instruments and/or sensors of a motor vehicle and provide control outputs to the engine or other components of the vehicle to control operation of the vehicle and/or engine thereof. It is within the skill of those knowledgeable in the arts to develop such digital program instructions, data, criteria and/or code segments based on the description and discussion herein as well as the general knowledge of those skilled in the automotive and computer arts.

As described further herein, the pressure sensing assembly 300 of the present invention is configured and arranged so as to embody and integrate the functional elements for sensing and measuring absolute pressure and differential pressure for an automotive fluid system (e.g., EGR or intake air). Such a pressure sensing assembly 300 is fluidly coupled to the fluid system (e.g., EGR piping) using any of a number of techniques known to those skilled in the art and appropriate for the intended use. In exemplary, illustrative embodiments such a pressure sensing assembly 300 is fluidly coupled to two pressure taps 242a,b provided in the EGR piping 240. In more particular aspects/embodiments, the portion of the EGR piping containing the EGR sensing system 200 including the pressure sensing assembly 300 can be a separate piping portion 201, a separate piping section or piping component that is installed in or attached (e.g., coupled to) to the EGR piping system.

More particularly, the pressure sensing assembly 300 or device is fluidly coupled to the pressure taps 242a, b that are located on either side of a venturi (restrictive venturi), orifice (restrictive orifice), throttle/throttle plate or other restrictive pressure device 244 or other mechanism as are known in the art that is disposed in the EGR piping or section of piping. As is known in the art, such restrictive pressure devices 244 introduce a pressure effect (e.g., pressure drop) in the piping system, which pressure effect can be measured as a differential pressure. Such a differential pressure also can be used to determine other flow properties of the flowing fluid/media (e.g., exhaust gas) such as for example, flow rate or mass flow rate in the piping. More particularly, one of the pressure taps or high pressure tap 242a is disposed on the upstream (in direction of flow) side or high pressure side (high side pressure) of the restrictive pressure device 244 and the other pressure tap or low pressure tap 242b is disposed on the downstream (in direction of flow) side or low pressure side (low side pressure) of the restrictive pressure device 244.

Figure 4:
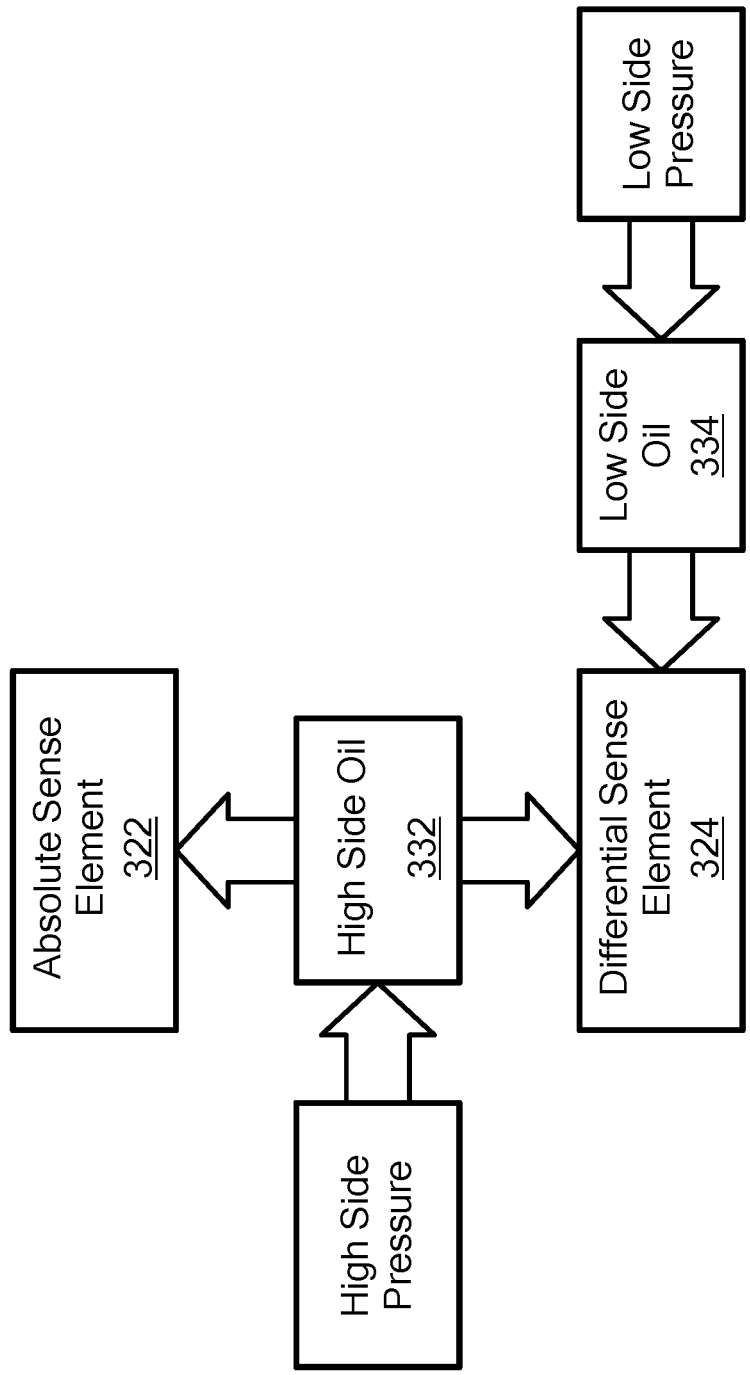
FIG. 4 is a schematic view illustrating the fluid coupling of the absolute and differential pressure sensing or sense elements to the flowing fluid or media (e.g., liquid or gas).
Figure 5:
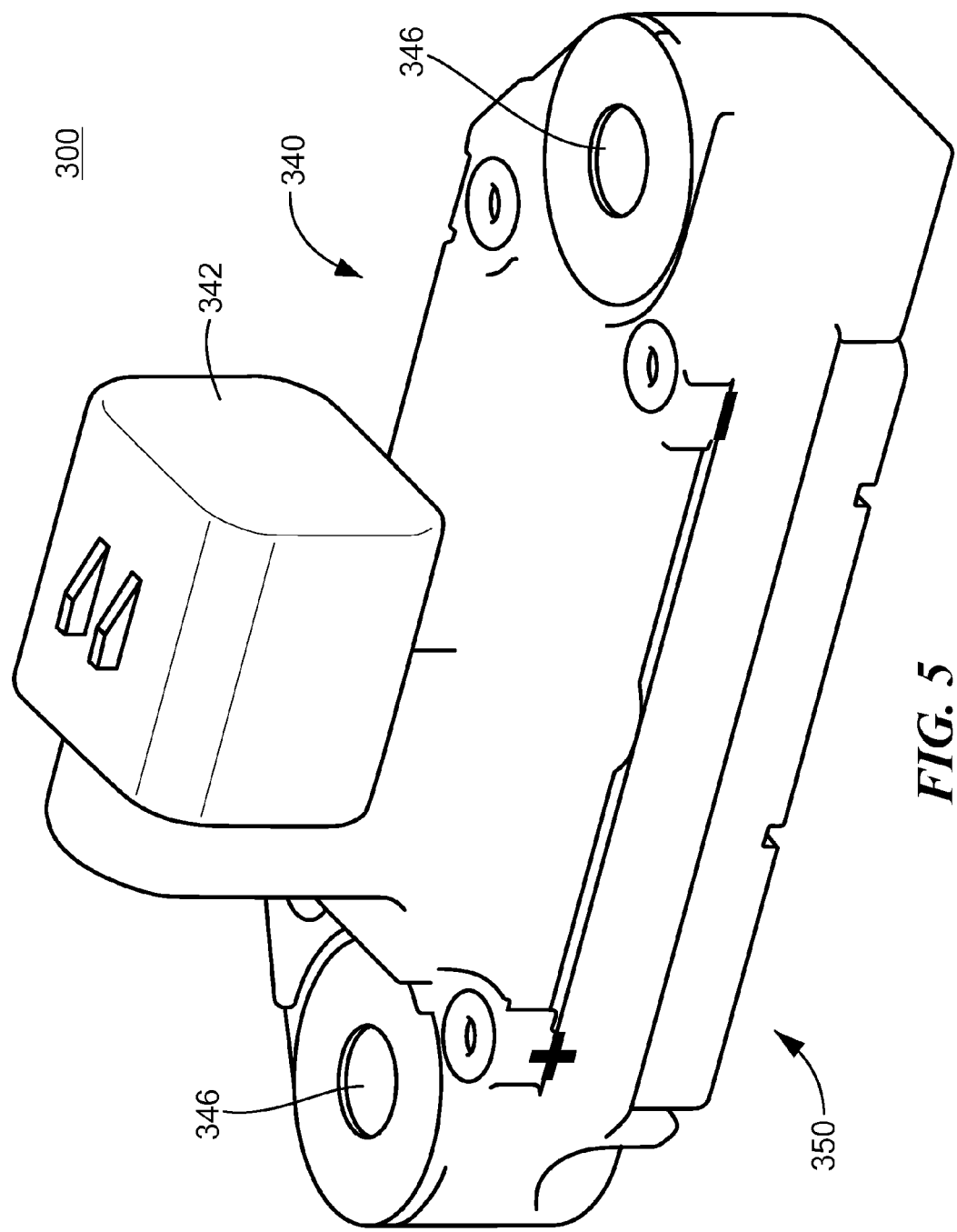
FIG. 5 is an isometric view of a pressure sensing assembly according to the present invention.
Figure 6:
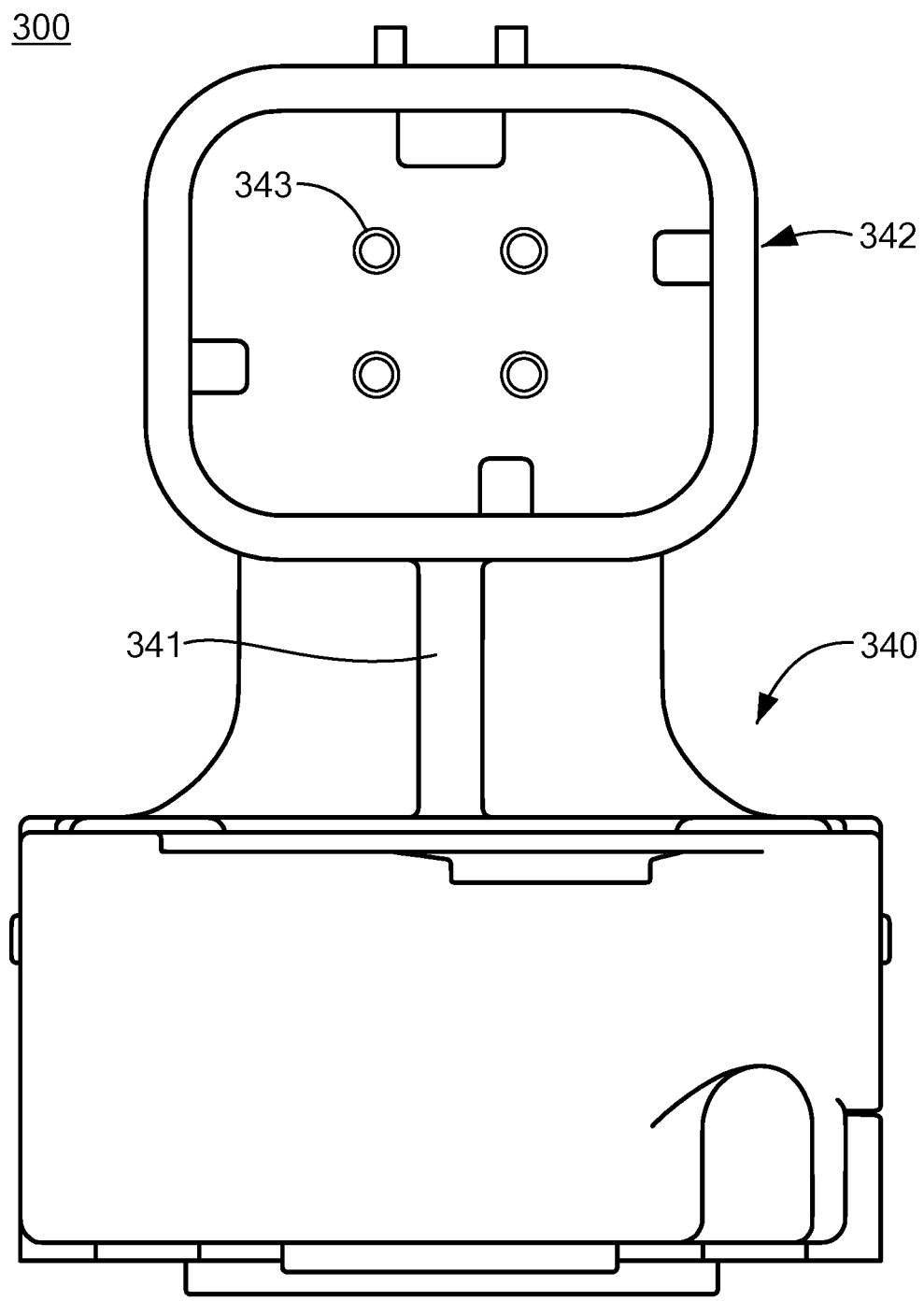
FIGS. 6-9 are various views of the pressure sensing assembly of FIG. 5, more particularly—an end view (FIG. 6), a side view (FIG. 7), a top view (FIG. 8) and a bottom view (FIG. 9).
Figure 7:
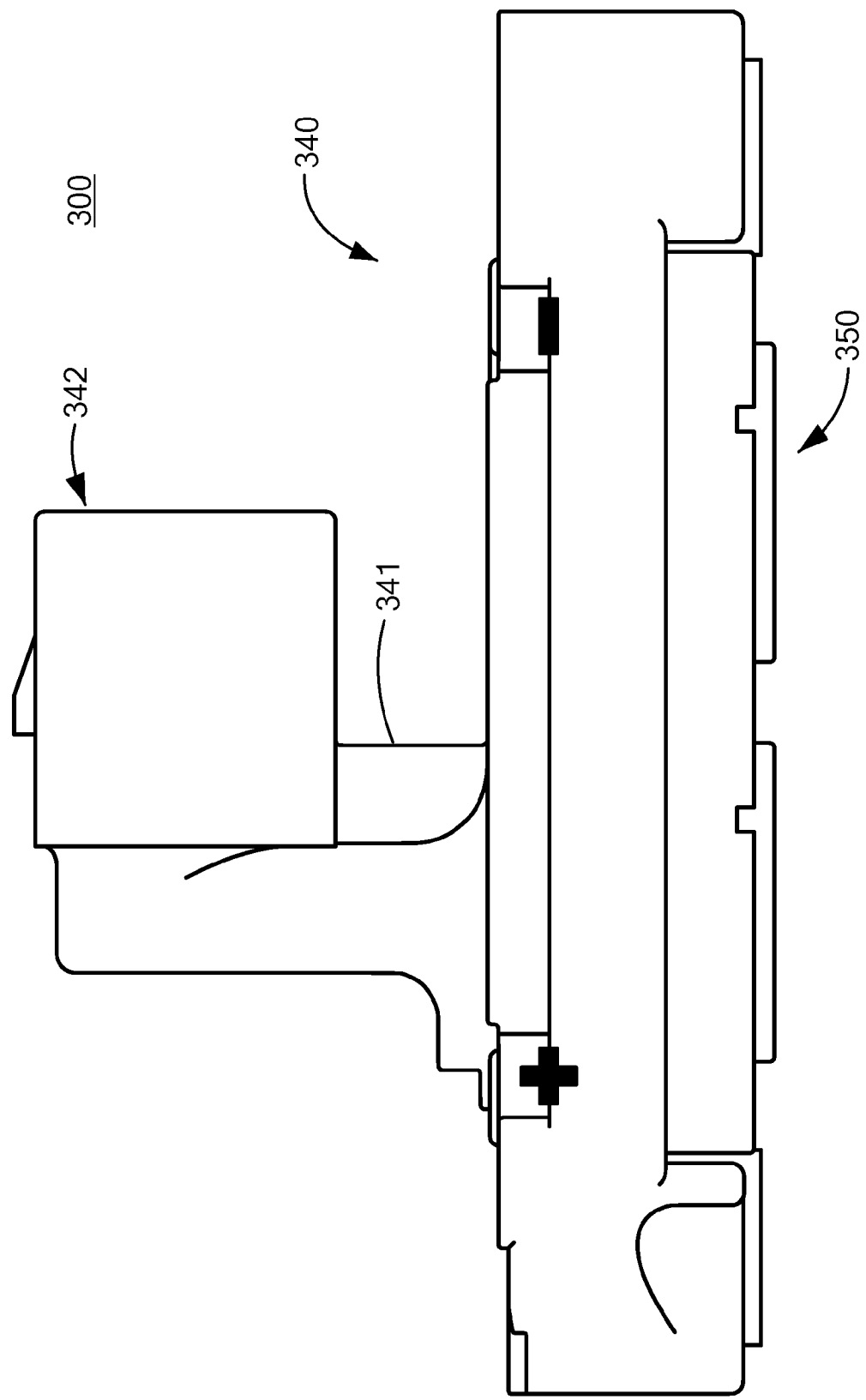
Figure 8:
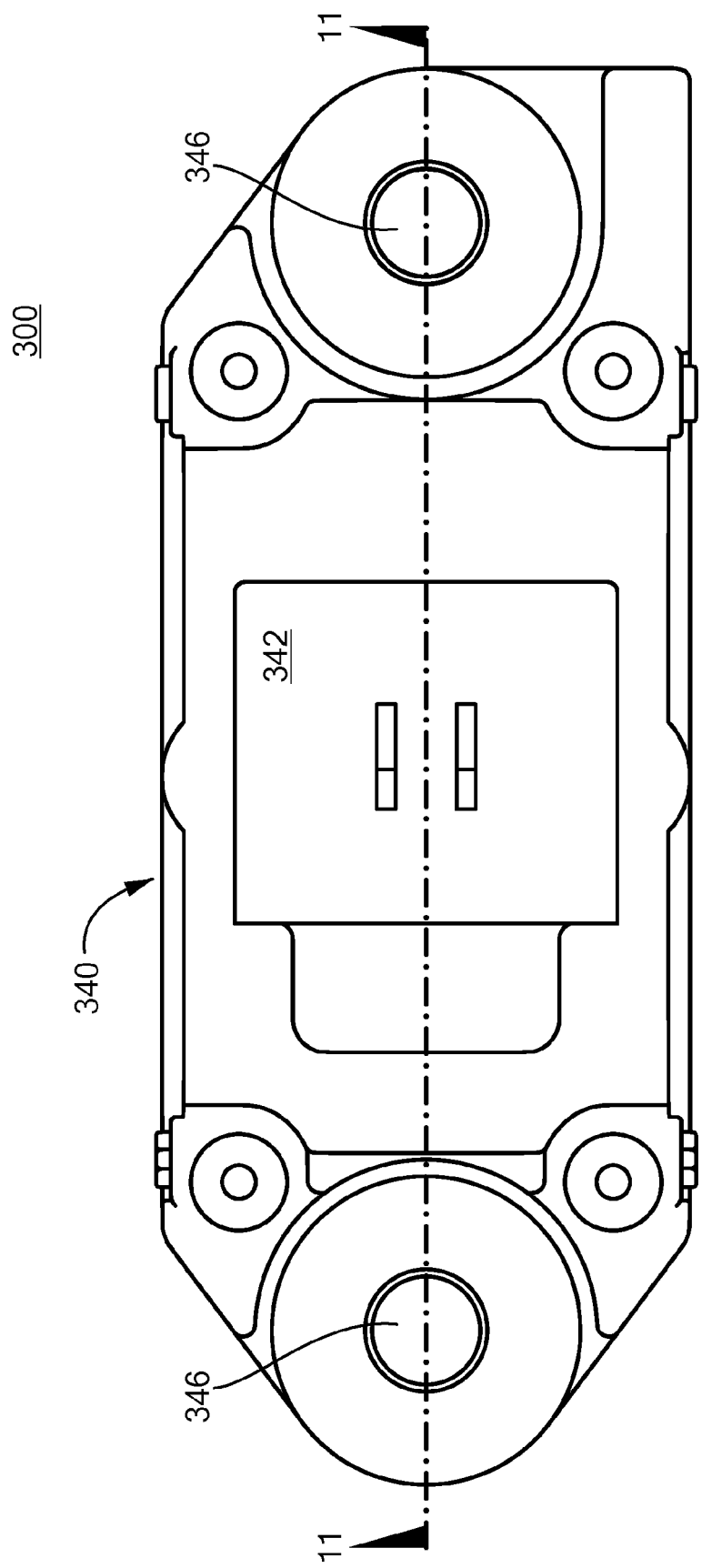

Referring now also to FIG. 4 there is shown a schematic view illustrating the fluid coupling of the absolute and differential pressure sensing elements to the flowing media (i.e., exhaust gas) within the EGR piping, more specifically, the media flowing in the EGR loop. In the illustrated embodiment, the high pressure side of the pressure restrictive device 244 is fluidly coupled to a non-compressible fluid 332 such as silicone oil (high side oil) within the pressure sensing assembly 300, which in turn is fluidly coupled to the absolute pressure sense element 322. The high side oil 332 also is fluidly coupled to the differential pressure sense element 324. More particularly, the high side oil is fluidly coupled to one side of the differential pressure sense element 324.

Also in the illustrated embodiment, the low pressure side of the pressure restrictive device 244 is fluidly coupled to another non-compressible fluid 334 such as silicone oil (low side oil) within the pressure sensing assembly, which in turn is fluidly coupled to the differential pressure sense element 324. More particularly, the low side oil 334 is fluidly coupled to another side of the differential pressure sense element 324 so that the sense element is sensing the differential pressure between the high pressure and low pressure side of the restrictive pressure device 244. In alternative embodiments, the absolute pressure sense element 322 is located so it is fluidly coupled to the non-compressible fluid 334 that is coupled to the low pressure side of the pressure restrictive device 244.

The absolute and differential pressure sense elements 322, 324 comprise any of a number of pressure sensing devices as are known in the art and appropriate for the intended use. In particular embodiments, the absolute and differential pressure sense elements are MEMS sense element. In yet more particular embodiments, the MEMS sense element embodies an integrated Wheatstone resistor bridge. The pressure being sensed/measured deflects the respective sense element thereby varying the resistance of the Wheatstone bridge. An ASIC operably coupled to the respective sense element converts this resistance difference into a voltage output which is communicated to the ECU 400. In yet further embodiments, the sense element is a piezoelectric type of device. Difference between the two pressures deflects the sense element, varying the resistance of the Wheatstone bridge. In illustrative exemplary embodiments, the absolute pressure sensing element/device includes an absolute pressure sensing device as manufactured by Silicon Microstructures, Melexis, First Sensor, and EPCOS and the differential pressure sensing element/device includes a differential pressure sensing device as manufactured by Silicon Microstructures, Melexis, First Sensor, and EPCOS.

In the embodiment illustrated in FIG. 3, the exemplary EGR sensing system 200 also includes a temperature sensing device/transmitter 220 that is operably and communicatively coupled to the ECU 400. Such a temperature sensing device/transmitter 220 is any of a number of devices/transmitters as are known to those skilled in the art and appropriate for the intended use. In illustrative, exemplary embodiments such a temperature sensing device/transmitter for an EGR application includes such a temperature sensing device/transmitter includes those manufactured by Sensata Technologies and for an intake air application it includes temperature sensing device/transmitter also as manufactured by Sensata Technologies.

As described herein, the ECU 400 receives inputs from the temperature sensing device/transmitter 220 that are utilized by the ECU to determine if and how much exhaust gas should be recirculated into the intake of the engine. In the case of an intake air application, the temperature sensing device/transmitter 220 would be adapted for use with intake air and related components to control the amount of intake air and/or the amount of air-fuel mixture being provided to the intake side of a given engine similarly to controlling the amount of EGR gas to be recirculated.

As indicated herein, such systems, apparatus, devices and methods of the present invention can be utilized in any of a number of applications where pressure (e.g., absolute or differential) is being measured or sensed alone or sensed in combination with another sensing element such as a temperature sensing element. Thus, it should be recognized that the present invention is not limited to applications involving only a combination of pressure sensing and temperature sensing.

It should be recognized that there are a number of techniques, methods or algorithms known in the art for performing EGR control using fluid parameters such as pressure, differential pressure and/or fluid temperature. More specifically, there a number of techniques, methods or algorithms known in the art for determining the mass flow rate of the exhaust gas being recirculated and thus for controlling exhaust gas recirculation. The one described further herein is illustrative of one technique, method or algorithm for doing this. As such it should be understood that the present invention is not limited to the described technique.

As indicated herein, exhaust gas is introduced into, or recirculated with, the engine intake so as to reduce cylinder temperatures, resulting in reduced NOx generation during combustion. In this regard, the mass flow of EGR being fed back into the intake is used to control the EGR system or loop. Such control is undertaken to control the blending of fresh air and EGR to adjust both emissions and fuel efficiency, thereby creating a feedback loop between the ECU and EGR valve. As also indicated herein, the venturi restriction can be utilized for calculating EGR mass flow.

The following illustrates in mathematical terms, one methodology for determining mass flow rate; where C=Orifice Flow Coefficient, Y=Expansion Factor, A2=Orifice Area, $P_1$=High Side Absolute Pressure, $\Delta P$=Differential Pressure, and Mw=Molecular Weight of the EGR.

$$\dot{m} = CYA_2\sqrt{2\rho_1(\Delta P)}$$

$$PV = nRT$$

$$PV = \frac{\rho V}{M_W}RT$$

$$\rho = \frac{PM_W}{RT}$$

$$\dot{m} = CYA_2\sqrt{2\left(\frac{P_1 M_W}{RT}\right)(\Delta P)}$$

Such operable, communicatively coupling between the pressure sensing assembly 300, the temperature sensing device/transmitter 220 and the ECU 400 is generally accomplished using wiring, typically in the form of one or more wiring harnesses 290a, b; one for connection to the pressure sensing assembly 300 (INTEGR) and one for connection to the temperature sensing device/transmitter 220 (TEMP). As is known in the art, such individual wiring harnesses can be later combined with other wiring harnesses which are appropriately routed within the motor vehicle to the ECU or other points of termination. Also, such wiring harnesses are typically provided with appropriate terminations or wire couplers to facilitate interconnecting the elements or wires of the wiring harness/harnesses to the temperature element 220, the pressure sensing assembly 300 and the ECU 400.

As described herein, in the present invention the pressure sensing assembly 300 is configured and arranged so as to embody and integrate the functional elements for sensing and measuring absolute pressure and differential pressure for a fluid system (e.g., EGR or intake air). As these absolute and differential pressure functions are integrated in the pressure sensing assembly 300, one wiring harness 290a therefrom is configured so as to communicate both the sensed and measured absolute pressure and differential pressure to the ECU 400.

Figure 2:
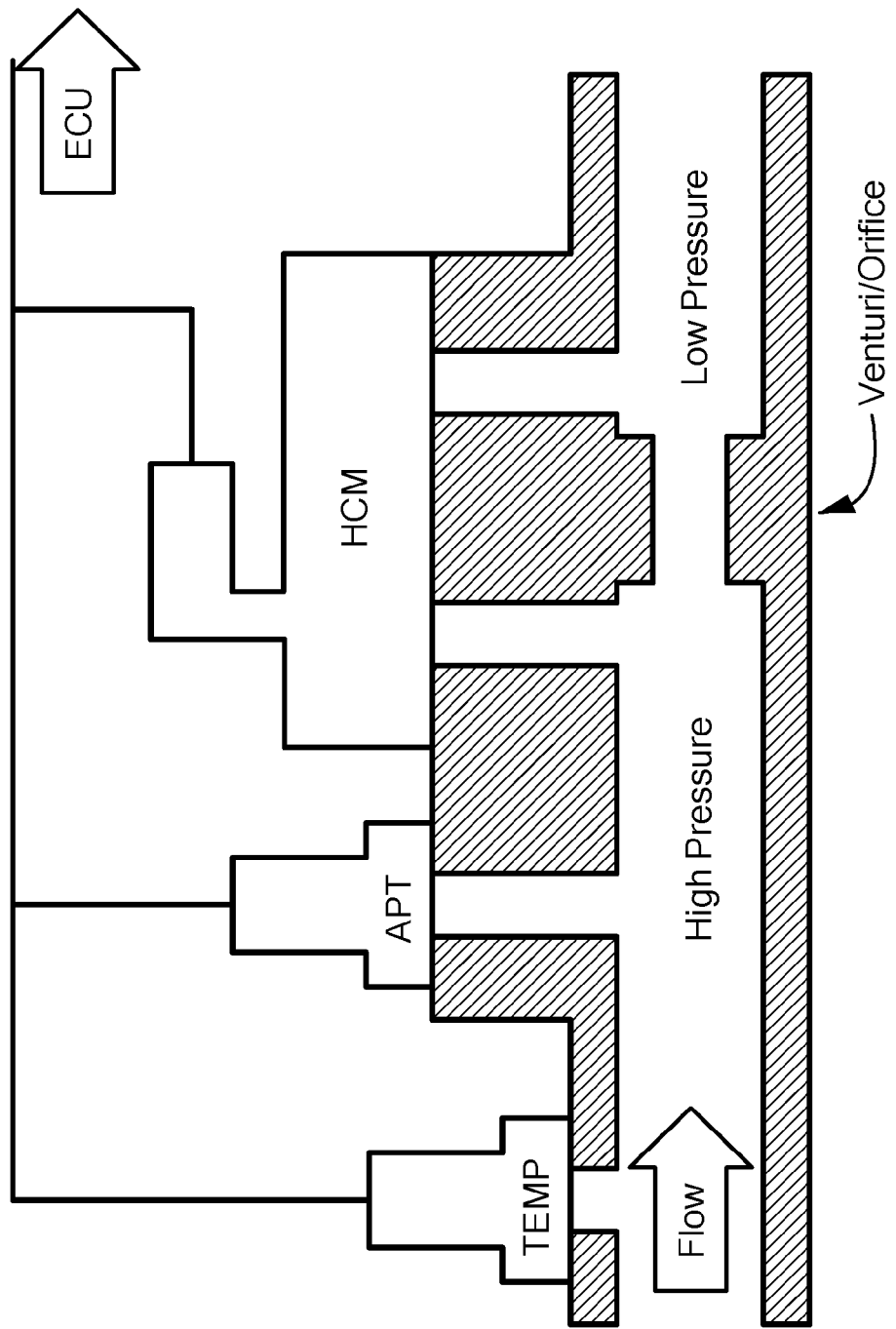
FIG. 2 is a schematic block diagram view of a conventional turbo-charged diesel engine illustrating a conventional EGR Loop.

In contrast to conventional pressure sensing systems, the pressure sensing assembly 300 of the present invention reduces part counts as there is no need to provide a separate absolute pressure transmitter nor a wiring harness to communicatively couple the ECU to such a transmitter such as shown in FIG. 2. This also reduces costs as there is no need to provide a separate pressure tap arrangement in the fluid system (e.g., EGR piping, intake air piping) for such a separate transmitter nor have to install such a separate transmitter in such a motor vehicle. Further there are cost savings as there is no need to wire up such a separate harness during assembly of the motor vehicle.

As indicated herein, a couple of conventional processes that use the measured pressures of a flow through a restriction (e.g., such as a venturi, throttle, or orifice) to calculate the mass flow of a media through a pipe involves the use of a differential pressure sensor across the restriction with a separate absolute pressure sensor on one side thereof or two absolute pressure sensors across the restriction. Such configurations, however, lead to inherent error in the mass flow calculation by compounding the errors between the two sensors.

The present invention substantially minimizes if not eliminates the compounding error by incorporating an absolute and differential sensor into one package, where the absolute sense element and a differential sense element are both mounted within the high side pressure port of a media isolated differential sense element filled with an incompressible fluid. By co-locating the sense elements in the same pressure port, accuracy impacts due to sensor spacing and media connection variation, such as port diameter tolerances, can be minimized/eliminated.

Also, the present invention embodies a sensor which orients the media isolating diaphragms horizontally to thereby reduce accumulation of contaminations such as soot or water which could impact sensor accuracy. Further, eliminating one complete sensor port, compared to a configuration using two discrete sensors, also reduces contamination accumulation sites and improves accuracy of the calculated mass flow.

Further, as there is no separate absolute pressure sensor/transmitter in the present invention, this necessarily means that the temperature sensing device can be located at a more optimal location with respect to the pressure sensing assembly 300.

In yet further embodiments, the piping, piping portion 201, piping section or component is configurable so as to embody a port to which the temperature sensing device 220 can be coupled to for measuring fluid temperature. In yet further embodiments, the pressure sensing assembly 300 can be adapted so as to be operably and/or communicatively coupled to the temperature sensing device such that the temperature sensing assembly is communicatively coupled to the ECU 400 via the pressure sensing assembly 300. In yet further embodiments, the pressure sensing assembly 300 can be adapted so as to further embody the temperature sensing function and sensing element which in turn would be coupled to the appropriate pressure port provided in the piping system. In these further embodiments, the pressure sensing assembly is further adapted so that these temperature outputs are appropriately communicated to the ECU.

Figure 9:
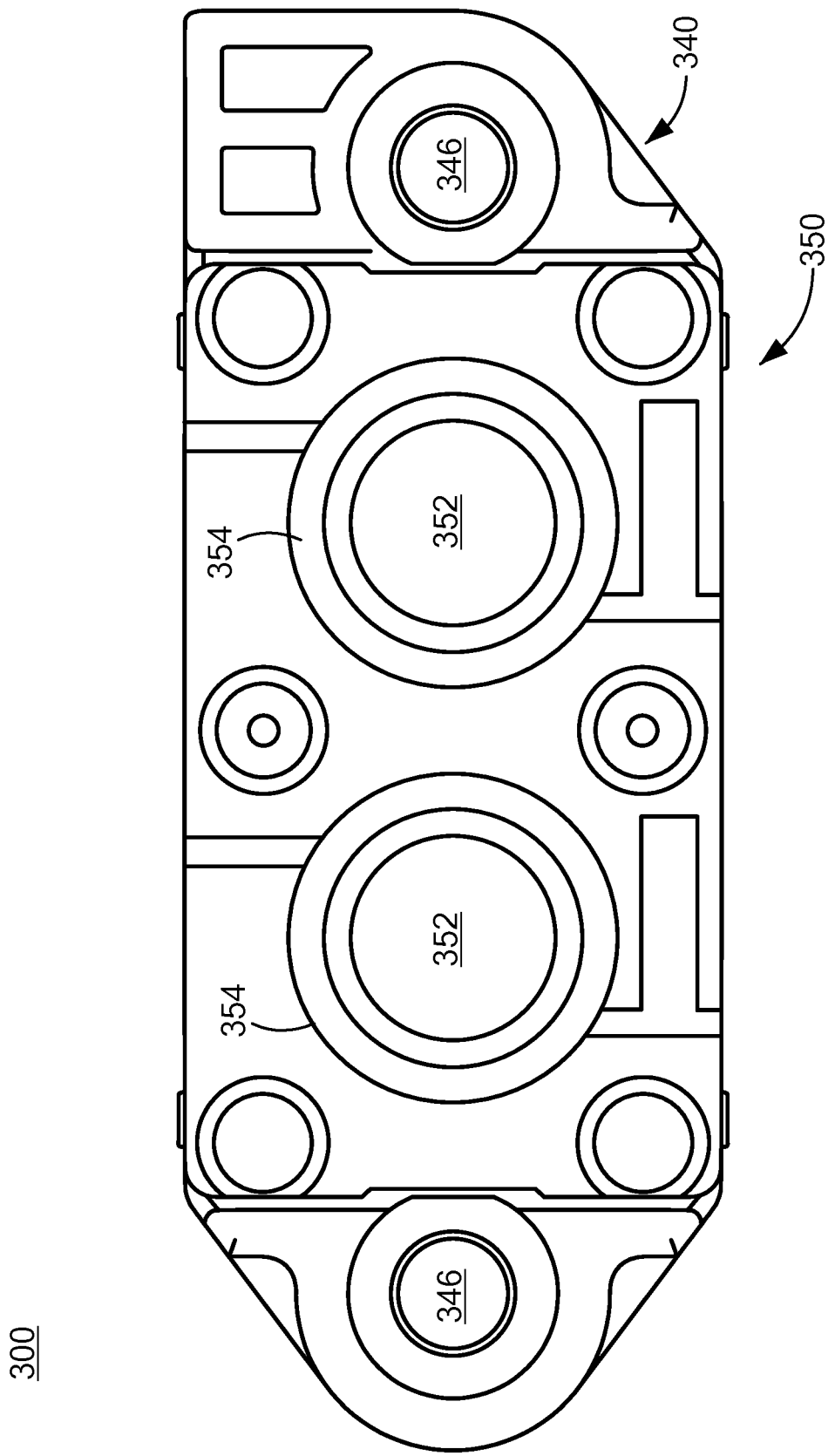
Figure 10A:
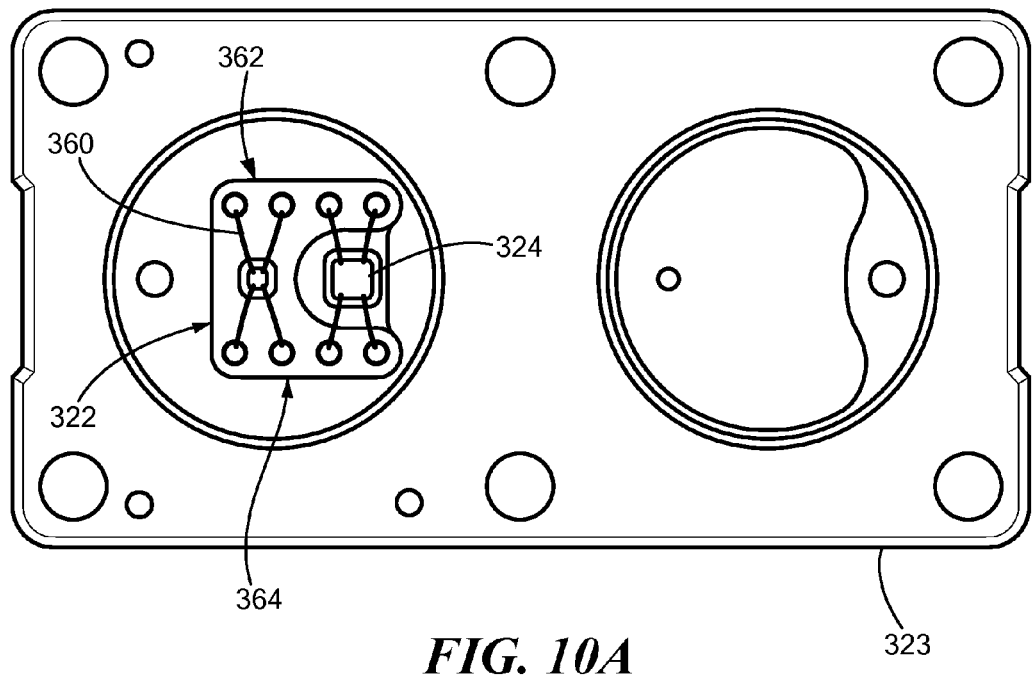
FIGS. 10A, B are various illustrative schematic views illustrating the arrangement of the absolute and differential pressure sense elements when disposed in the high side cavity (FIGS. 10A,B) and when fluidly coupled to the high side and the low side oil/cavities (FIG. 10B).
Figure 10B:
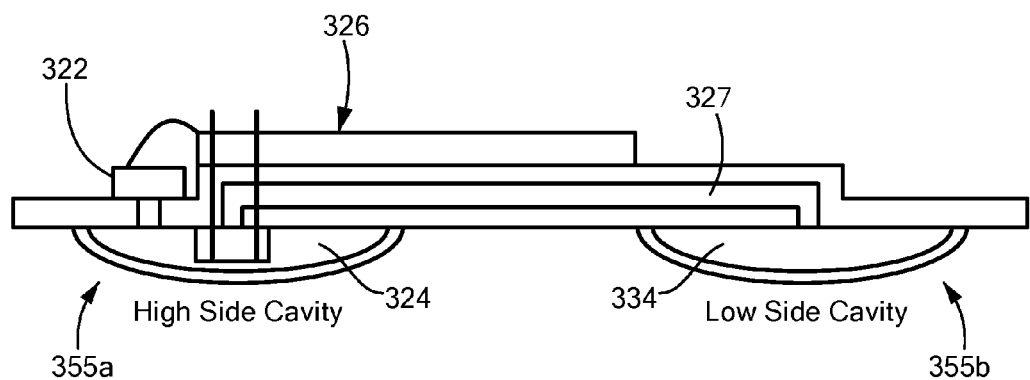
FIG. 10C is a schematic block diagram view of exemplary electrical circuitry and associated interrelationships of functional elements embodied in the pressure sensing assembly more particularly including but not limited to the absolute and differential pressure sense elements and circuit board or digital processing devices thereof.
Figure 11:
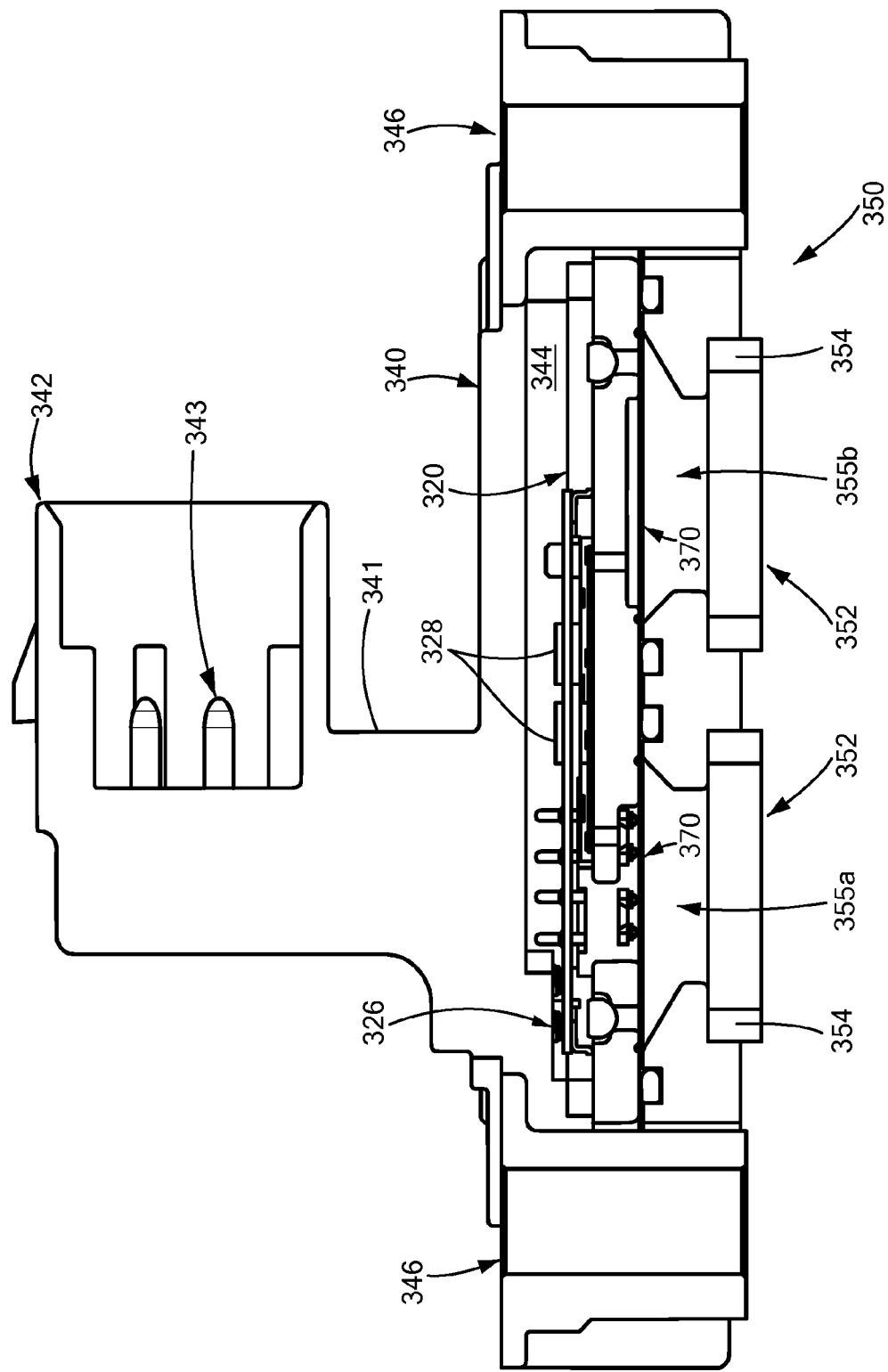
FIG. 11 is a cross sectional view of the pressure sensing assembly of FIG. 5 along section line 11-11 of FIG. 8.
Figure 12A:
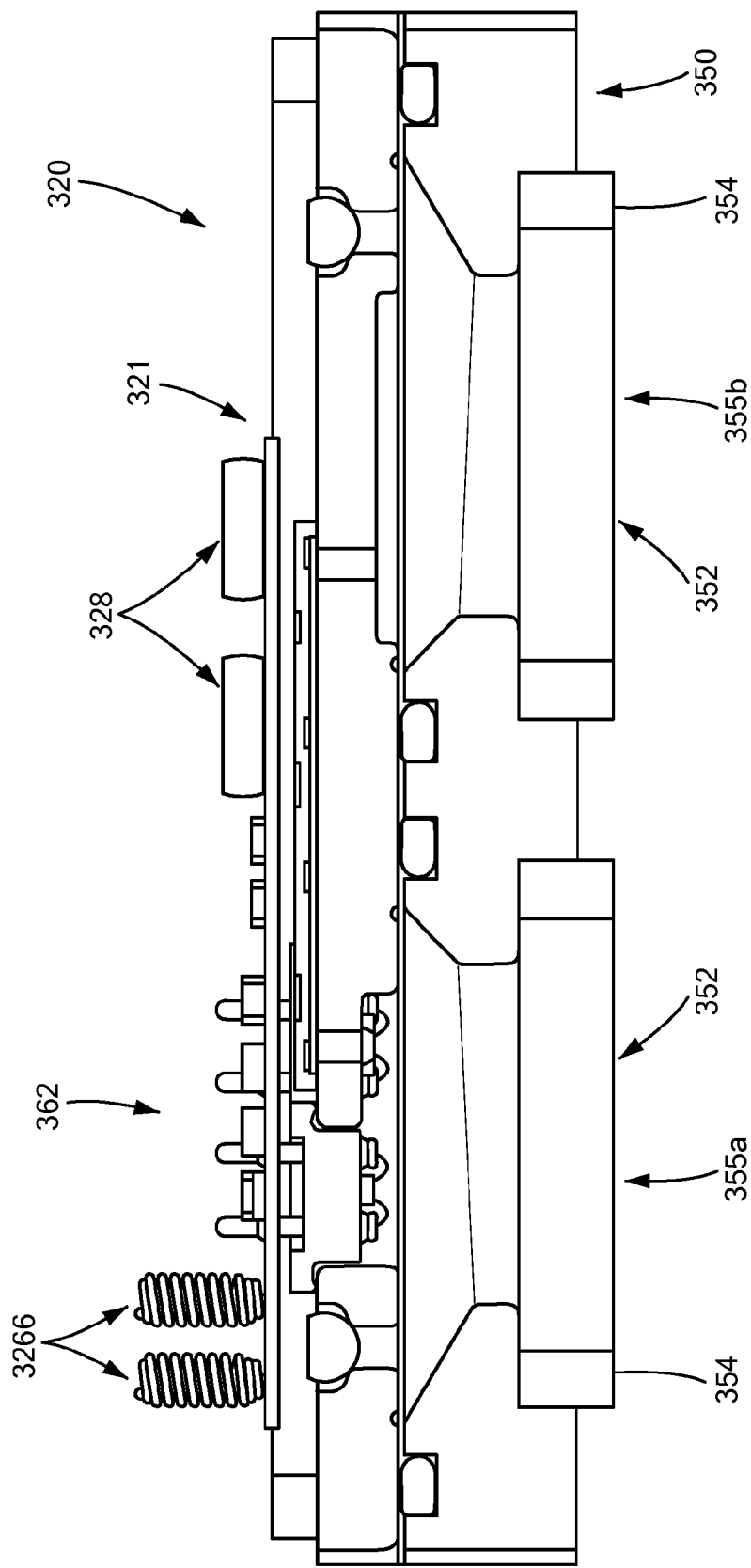
FIGS. 12A, B are cross sectional views of the pressure sensing assembly of FIG. 5 along section line 11-11 of FIG. 8 but without the upper housing for clarity where FIG. 12B more particularly illustrates the high and low side oil cavities.
Figure 12B:
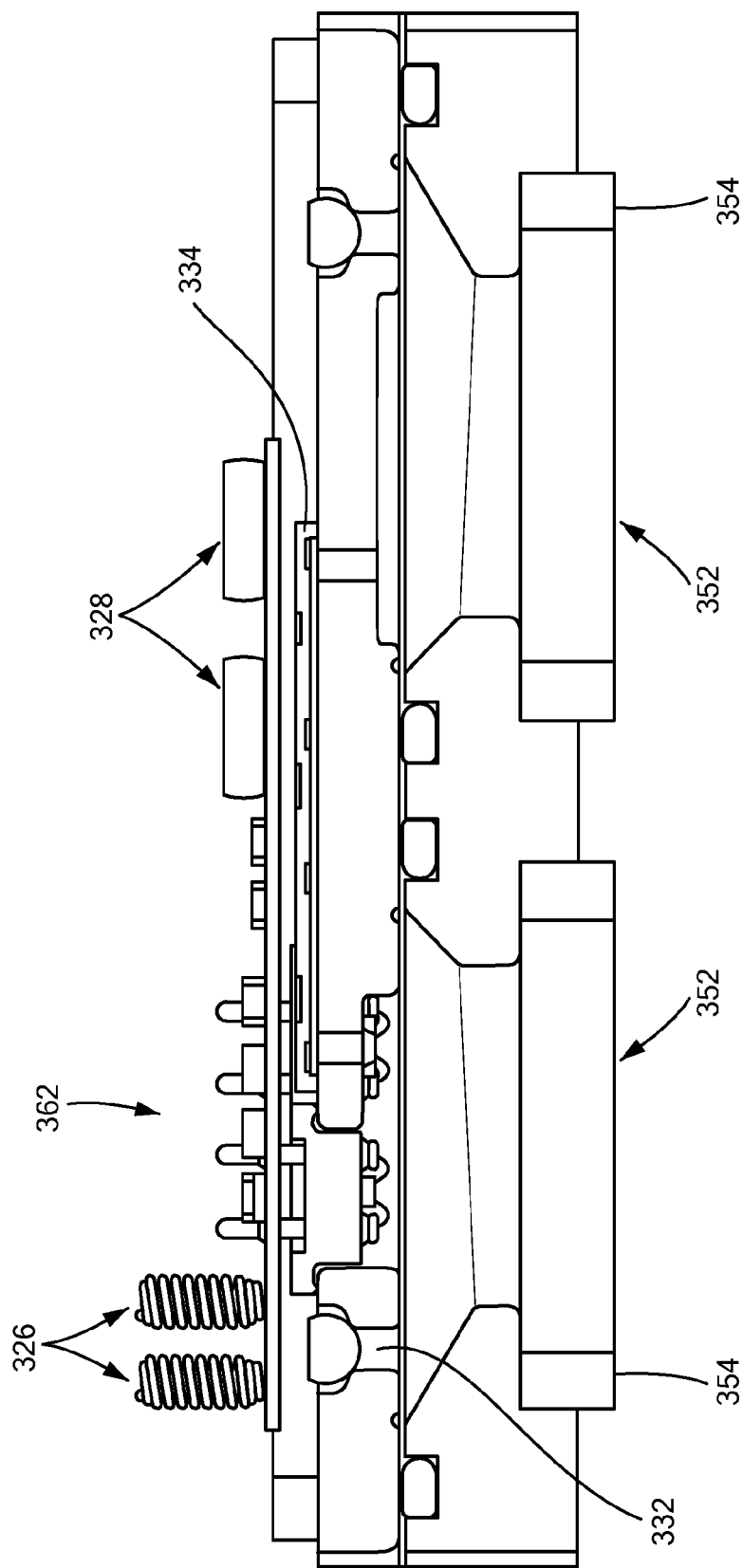

Referring now to FIGS. 5-9 there are shown various views of a pressure sensing assembly 300 according to the present invention, more particularly, an isometric view (FIG. 5); an end view (FIG. 6), a side view (FIG. 7), a top view (FIG. 8) and a bottom view (FIG. 9). There also is shown in FIGS. 10A, B various illustrative schematic views illustrating the arrangement of the absolute and differential pressure sense elements 322, 324 when disposed in the high side cavity (FIGS. 10A,B) and when fluidly coupled to the high side and the low side oil/cavities (FIG. 10B). Further, there is shown in FIG. 11 a cross-sectional view of the pressure sensing assembly 300 of FIG. 5 along section line 11-11 of FIG. 8 and FIGS. 12A, B are additional cross-sectional views of the pressure sensing assembly of FIG. 5 along section line 11-11 but without the upper housing 340 for clarity. In FIG. 12B, the cross sectional view more particularly illustrates the high and low side oil cavities. Reference also should be made to U.S. Pat. No. 7,578,194 that is co-owned and the teachings of which are incorporated herein by reference, for details of such a pressure sensing assembly not otherwise described in the following.

Such a pressure sensing assembly 300 includes an upper housing 340 that includes a connector portion 342 and receives in a recess 344 thereof the pressure sense element module 320. The pressure sense element module 320 includes a body 321 in which the differential pressure sense element 324 is fluidly coupled to both the high and low side oil 332, 324 and in which the absolute pressure sense element is fluidly coupled to the high side oil 332 as described herein. As a result, the differential pressure sense element 324 is fluidly coupled to the high and low pressure sides of the restrictive device 244 and the absolute pressure sense element is fluidly coupled to the high pressure side of the restrictive device 244. In addition, the pressure sensing assembly 300 includes a lower housing 350 having first and second port connections 352 that are fluidly coupled to the EGR fluid system or piping 240 or the intake fluid system and which is disposed on the lower surface of the pressure sensing assembly. In more particular embodiments, the lower housing 350 is received in a portion of the recess 344 in the upper housing 340 below the pressure sense element module 320 (see FIG. 11).

The connector portion 342 is configured and arranged so as to include a plurality of pins 343 whose proximal ends operably and communicatively couple the pressure sensing assembly 300 to the ECU 400. In more particular embodiments, the connector portion is configured and arranged so as to include four such pins. The connector portion 342 and the proximal ends of the pins 343 are further configured and arranged so that a termination of the associated wiring or wiring harness 490a can be operably coupled to the connector portion and pins such that output signals associated with the absolute and differential pressure sense elements 324, 322 are outputted to the ECU 400 via the wiring harness. In an illustrative, exemplary embodiment the connector portion 342 and pins 343 comprise a Tyco Ampseal 16 4-pin connector system with cylindrical pins in a 2×2 pin layout. The upper housing 340 further includes a connector support 341 that is arranged so as to prevent sagging of the connector portion 342.

In further illustrative exemplary embodiments, the upper housing 340 is configured and arranged so as to include one or more (e.g., a plurality of) through apertures that are used to mount and secure the pressure sensing assembly 300 to the fluid system (e.g., EGR loop/system 240 or intake air system). Such through apertures can be further configured so as to include bushings, such as metal bushings. Any of a number of fasteners (e.g., bolts, studs, nuts, etc.) as are known to those skilled in the art and appropriate for the intended application can be used to secure the pressure sensing assembly 300 to the fluid system piping 240 or piping portion 201, piping section or component embodied in such a fluid system.

The lower housing 350 also is configured and arranged so as to include a plurality of sealing devices 354, such as for example O-rings, that are disposed with respect to each of the first and second port connections 352 such that when the pressure sensing assembly 300 is mounted and secured to the fluid system (e.g., EGR loop/system 240 or intake air system) the sealing devices 354 provide a fluid seal between the pressure sensing assembly 300 and the fluid system with the high and low pressure sources of the flowing fluid (e.g., exhaust gas, intake air). In more particular embodiments, the sealing devices 354 are O-rings that are disposed about the first and second port connections 352 such as for example in suitable O-ring seats in the bottom surface of the lower housing 350 thereby providing a fluid seal. In further embodiments, the first and second port connections 352 are further configured so as to include a grill like arrangement, such as cross bars defining openings to allow fluid flow there through.

The upper and lower housings 340, 350 are made of any of a number of materials (e.g., moldable materials) that are suitable for the intended use/application. In exemplary embodiments, such materials include for example, polyetherimide (PEI).

Such a pressure sense element module 320 includes, in addition to the absolute pressure sense element 322 and the differential pressure sense element 324, a printed circuit board 326 that is operably and communicatively coupled to the absolute and differential pressure sense elements. When the pressure sense element 320 is disposed in the recess 344 in the upper housing 340, the circuit board 326 is arranged so as to be disposed on a top or top surface of the pressure sense element module 320.

Figure 10C:
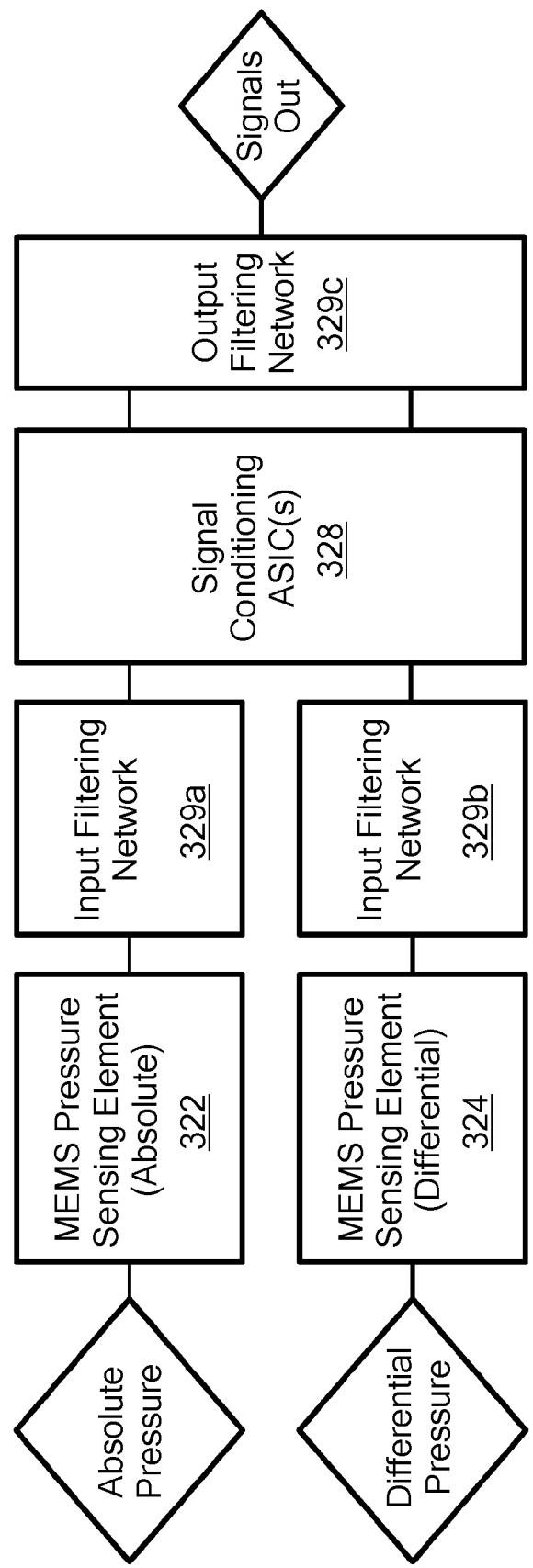

The printed circuit board 326 is configured and arranged so as to embody therein two ASICs 328, one ASIC for the absolute pressure sense element 322 and the second ASIC for the differential pressure sense element 324, as well as circuit or wiring traces to appropriately interconnect circuit elements. There is shown in FIG. 10C a schematic block diagram view of exemplary electrical circuitry and associated interrelationships of functional elements embodied in the pressure sensing assembly 300 more particularly the pressure sense element 320 including but not limited to the absolute and differential pressure sense elements and circuit board or digital processing devices thereof. As shown in FIG. 10C, the printed circuit board also is configurable so as to embody one ASIC 328 for both the absolute pressure sense element 322 and the differential pressure sense element 324.

More particularly, there is shown a schematic view of an illustrative block diagram of an exemplary electrical circuit embodied in the pressure sense element module 320 and the circuit board 326, where ABS or absolute pressure relates to the absolute pressure sense element 322 and DP or differential pressure relates to the differential pressure sense element 324. As described further herein, such ASICs are integrated circuits that embody hardware and software so as to control operation of the respective pressure sense element and to provide a signal output that is appropriate for receipt by the ECU 400. As is known to those skilled in the art any of a number of digital processing devices as are known in the art or hereinafter developed can be easily adapted by those skilled in the art for use as replacements for such ASICs.

As also shown in FIG. 10C, such electrical circuitry can include input filtering networks 329a, b for filtering the input signals respectively from the absolute and differential pressure sense elements 322, 324 and the output filtering network 329c for filtering the signals being outputted from the ASIC 328. Such filtering networks are well within the skill of those knowledgeable in the arts and thus are not described further herein.

Each of the ASICs 328 are more particularly configured and arranged to match transfer function, response time, and electrical performance of each of the pressure sense elements 322, 324. In addition, each of the ASICs are configured and arranged so as to receive the electrical signals (e.g., voltages) coming from each of the absolute and differential pressure sense elements 322 and to output a signal(s) to the ECU 400 representative of the measured pressure. Such ASICs 328 also are configured and arranged so as to control the operation of the individual pressure sense elements to which it is coupled to, as well as to control the signals being outputted. For example, the ASIC can be configured and arranged so that a preset pressure signal is outputted when the output from the sense element is above or below a preset value.

A plurality of contact springs 326 are arranged so as to extend between the top surface of the pressure sense element module 320 and the upper housing 340. More particularly, four contact springs are provided. Each of the provided contact springs 326 are disposed in a suitable bore in a wall of the upper housing 340 so as to extend between a respective distal end of each of the terminals 343 within the upper housing and a respective circuit feature or element of the circuit board 326. Such an arrangement allows for the operably and communicatively coupling of the circuit board (e.g., ASICs 328) and the ECU 400 via the respective wiring harness. In further aspects/embodiment, the bores can be sealed with suitable material, such as RTV, such as following assembly and calibration.

The top surface of the pressure sense element module 320 and the upper housing 340 are suitable configured and arranged so that an environmental O-ring or other sealing device can be disposed in a seat formed in the upper housing recess 344 and the top surface of the sense element module 320. This sealing structure is provided so the pressure sense element module 320 is protected or isolated from environmental conditions.

The pressure sense element module 320 further includes a baseplate 323 to which is mounted the absolute and differential pressure sense elements 322, 324 as more particularly shown in FIG. 10A. Such a base plate 323 is made of a suitable material, such as for example polyphenylene sulfide (PPS). Further, each of the absolute and differential pressure sense elements 322, 324 are operably coupled by wires 360 to respective electrical terminal pins 362 and thence to the respective ASIC. More particularly, the absolute pressure sense element 322 is coupled to four of the electrical terminal pins 362 and the differential pressure sense element 324 is coupled to four other electrical terminal pins 362.

In illustrative embodiments, the pressure sense element module 320 further includes a U-shaped member 364 that is inserted into a corresponding opening in the baseplate 323. The U-shaped member is configured and arranged so that the absolute pressure sense element 322 is appropriately secured to it and so as to retain the electrical terminal pins 362. The differential pressure sense element 324 is mounted to the base plate using any of a number of techniques as are known to those skilled in the art. In exemplary embodiments, compression sealing or welding is used to provide a pressure tight seal between the terminal pins and the surrounding material (e.g., baseplate, U-shaped member coupled to the base plate, etc.).

As shown schematically in FIG. 10B, one side of the differential pressure sense element 324 and the absolute pressure sense element 322 are thus arranged so as be fluidly coupled to high side oil 332 which is in turn fluidly coupled to the high side cavity 355a. Another side of the differential pressure sense element is fluidly coupled via a channel 327 to the low side oil 334 which is in turn fluidly coupled to the low side cavity 355b.

The pressure sensing assembly 340 further includes a plurality of metallic discs or flexible metal diaphragms 370 that are interposed at an interface between the lower housing 350 and the pressure sense element module 320. The lower housing 350 is further configured and arranged so as to include a sealing mechanism (e.g., O-ring, adhesives, etc.) to sealingly engage the diaphragms 370 so to thereby create a chamber for the non-compressible fluid (i.e., the high side oil 332 and the low side oil 334) and so as to thereby isolate the absolute and differential pressure sense elements 322, 324 from the sensed media. The diaphragms 370 also are arranged within the pressure sensing assembly 340

The diaphragms 370 are impermeable and robust to the media being sensed such as for example, long term usage. For example, when the media to be sensed is an acidic exhaust gas media, suitable materials could include tantalum, niobium, titanium and stainless steel. In intake air applications, the fuel of the fuel-air mixture also can contain constituents that require similarly robust materials for the diaphragms. As indicated above, the diaphragms 370 also are preferably made up so to be flexible and thus responsive to any changes in pressure caused by the flowing media or fluid (e.g., exhaust gas). In this way, the respective non-compressible fluid 332, 334 responds appropriately as the pressure of the fluid flow be sensed increases or decreases.

As shown in FIGS. 11-12, the diaphragms 370 are mounted such that when the pressure sensing assembly 300 is mounted in the EGR loop/system or the intake air fluid system, the diaphragms lie in a plane that is generally perpendicular to gravity. The above described arrangement of the pressure sensing assembly, only one part, the lower housing 350 needs to be robust with the sensed media, thus other parts (e.g., upper housing 340) can be made using less expensive materials that are appropriate for the intended use.

In further aspects/embodiments, fill hole(s) are provided in a top surface of the baseplate 323 that are arranged so as to be fluidly coupled to the chamber for the non-compressible fluid (i.e., the high side oil 332 and the low side oil 334) for the respective absolute and differential pressure sense elements 322, 324. During assembly of the pressure sensing assembly 300, the non-compressible fluid is introduced into the respective chambers for the absolute and differential pressure sense elements via these fill holes. After the chamber are filled, the fill hole(s) are appropriately sealed such as by a ball that is welded in place thereby closing the fill hole (e.g., see FIG. 11).

As described herein (see FIG. 10B), a channel 327 forms part of the chamber for the low side oil 334 so the non-compressible medium/fluid that is in fluid communication with one side of the differential pressure sense element 334, is also in fluid communication with the diaphragm 370 that is in fluid communication with the low pressure side cavity 355b. As so configured, the differential pressure sense element 334 is responsive to changes in pressure in the low pressure side cavity 355b corresponding or related to pressure changes of the flowing fluid/media impinge upon this one side of the differential pressure sense element. Correspondingly, the other side of the differential pressure sense element 334 is responsive to changes in pressure in the high pressure side cavity 355a corresponding or related to pressure changes of the flowing fluid/media impinge upon this other one side of the differential pressure sense element. In this way, the differential pressure sense element can detect and measure the differential pressure across the restrictive pressure device 244.

As the absolute pressure sense element 322 is in fluid communication with the high side oil 332 which is also in fluid communication with the diaphragm that is in fluid communication with high pressure side cavity 355*a*, the absolute pressure sense element is responsive to changes in pressure in the high pressure side cavity 355*a*. In this way, the absolute pressure sense element can detect and measure the absolute pressure on one side of the restrictive pressure device 244.

In further embodiments, components of the pressure sensing assembly 300 such as the upper housing 340 and the pressuring sensing assembly 320 can be formed of materials other than the moldable plastic described herein. They can be made of any of a number of materials known in the art and appropriate for the intended use, such as a suitable metal (e.g., stainless steel) or ceramics (e.g., alumina).

Figure 1:
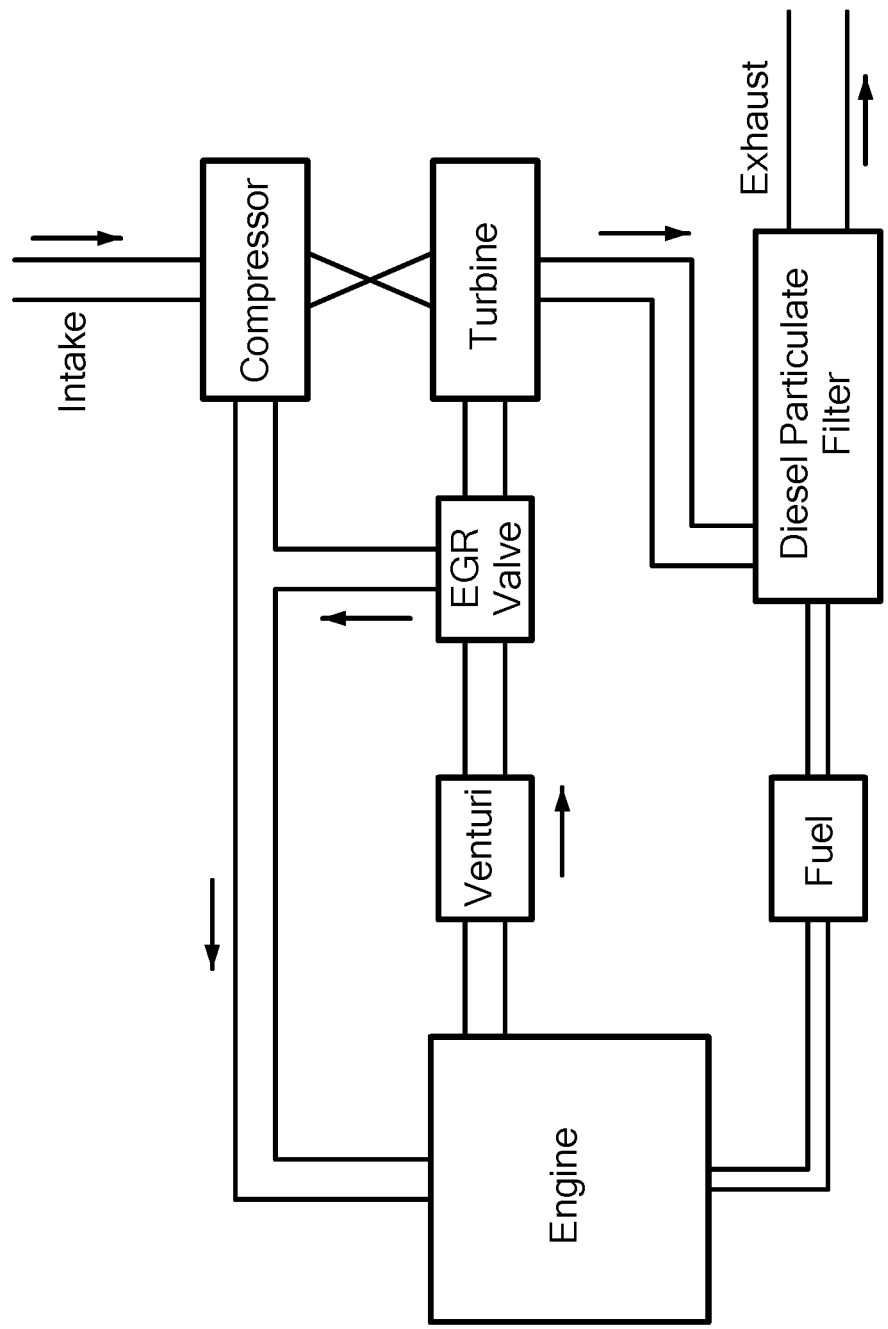
FIG. 1 is a schematic block diagram view of a conventional assembly for use in determining the mass flow rate when used in an exhaust gas recirculation application.

As described herein, the present invention also features a system for measuring at least absolute and differential pressure of a flowing fluid. Such a system includes a fluid system portion or fluid system piping 240 (such as also shown in FIG. 1) and a measuring and signal outputting device (e.g., pressure sensing assembly 300). The fluid (e.g., liquid or gas) flows in the fluid system piping and the fluid system is configured and arranged so as to include a first pressure tap 242*a* and a second pressure tap 242*b* that are spaced from each other such that the second pressure tap is downstream of the first pressure tap in a direction of the fluid flow. The measuring and signal outputting device (pressure sensing assembly 300) measures absolute and differential pressure of the flowing fluid in the fluid system portion and provides signal outputs of the measured absolute and differential pressures.

The measuring and signal outputting device/pressure sensing assembly 300 includes a housing 340 having a plurality of cavities that are fluidly coupled in spaced relation to the fluid system piping (e.g., first and second pressure taps 242*a,b*) and so as to be fluidly coupled to the flowing fluid and a pressure sense element module 320 or pressure sensing module mounted to the housing. Such a pressure sense element module 320 includes an absolute pressure sense element 322 that is first fluidly coupled to one of the plurality of cavities so as to thereby measure an absolute pressure representative of the flowing fluid to which the said one cavity is fluidly coupled to. The pressure sense element module 320 also includes a differential pressure sense element 324 that is second fluidly coupled to said one cavity and to another of the plurality of cavities so the differential pressure sense element measures a differential pressure of the flowing fluid to which said first and another cavities are fluidly coupled to. As described herein, each of the absolute pressure sense element and the differential pressure sense element comprise a MEM sense element.

Further, a non-compressible medium 332, 324 is disposed in said one cavity and said another cavity so that the non-compressible medium is located between the respective absolute and differential pressure sense elements 322, 324 and the flowing fluid so as to thereby isolate the pressure sense elements from the flowing fluid while allowing the sense elements to be responsive to the pressure of the flowing fluid. As indicated herein, the flowing fluid includes a flowing liquid or a gas such as the exhaust or intake air of a conventional internal combustion engine fueled by a hydrocarbon such as gasoline, diesel or propane.

Such a system further includes a signal analysis device such as an ECU 400. More particularly, the pressure sensing assembly 300/measuring and signal outputting device is operable coupled to the signal analysis device/ECU400 which allows the pressure sensing assembly to provide signal outputs of the measured absolute and differential pressures to the signal analysis device/ECU 400. The signal analysis device/ECU 400 is appropriately configured and arranged so that it can process these signal outputs (or signal inputs) and further provide outputs or signals (e.g., control signals or outputs) to system components (e.g., engine components) so as to control functionalities and process parameters (e.g., fluid flow, pressure, etc.) so that the system including associated engine/motor vehicle are operated in the desired fashion.

More particularly, the signal analysis device/ECU 400 embodies a digital processing device (such as a microprocessor, ASIC or the like) that is configured and arranged to received and process such signal inputs (e.g., outputs of measured temperature, absolute pressure and differential pressure) and to output control signals and/or outputs that are used to control other functionalities of the fluid system. More particularly, such a digital processing device would include (in hardware and/or software) instructions, criteria, code segments to process such signal outputs to determine how the controlled functionalities of the fluid system should be arranged so as to thereby control operation and process parameter(s) of the fluid system and thus for example operation of the internal combustion engine. More specifically, the signal analysis device/ECU, more particularly the digital processing device thereof, processes these inputs (e.g., outputs of measured temperature, absolute pressure and differential pressure) to determine a mass flow rate of the flowing gas in the fluid system, which in turn can be used to determine how the fluid system functionalities should be controlled.

For example, in the case where the application is exhaust gas recirculation (EGR), the signal analysis device/ECU would process the inputs to provide control signals or control outputs to the appropriate EGR system functionalities to control the amount of exhaust gas being recirculated to the intake side of the engine. In the case where the application is the intake air for the engine, the signal analysis device would provide control signal or control outputs to the appropriate intake functionalities (e.g., throttle valve) to control the amount of intake air being provided to the engine. Such a signal analysis device/ECU also can receive other inputs or signals from other devices (e.g., sensors, fluid temperature, engine speed, throttle inputs from driver (e.g., depression of the acceleration peddle)) for purposes of controlling such functionalities.

As indicated herein, the pressure sense element module 300/sensing module further includes a fluid channel that is arranged so as to be fluidly coupled between said another cavity and the differential pressure sense element 324. The fluid channel also contains the non-compressible medium 334. The fluid channel also is configured and arranged so as to communicate a second pressure representative of the flowing fluid at said another cavity location to the differential pressure sense element 324. As described further herein, the absolute pressure sensing element 322 and the differential pressure sense element 324 are disposed in said one cavity.

In yet further aspects/embodiments the fluid system 200 or piping portion 201 is more particularly arranged so as to include a restrictive pressure device 244 that is disposed between the first and second pressure taps 242*a,b*. Also, the housing 340 is arranged so that said one cavity and said another cavity are connected to the respective first and second pressure taps so said one cavity and said another cavity are disposed upstream and downstream of the restrictive pressure device in a direction of the flowing fluid (e.g., flowing liquid or gas). Such a restrictive pressure device is one of a restrictive venturi, an orifice or a throttle plate.

Such a pressure sense element module 320/measuring and outputting device further includes first and second digital processing mechanisms. The first digital processing mechanism is configured and arranged for controlling operation of the absolute pressure sense element 322 and for providing an output representative of the absolute pressure being measured. The second digital processing mechanism is configured and arranged for controlling operation of the differential pressure sense element 324 and for providing an output representative of the differential pressure being measured. In yet further embodiments, each of the first and second digital processing mechanisms comprise an ASIC 328 or other digital processing mechanism as is known to those skilled in the art and appropriate for the intended use. In addition, each of the first and second digital processing devices are operably or communicatively coupled to the signal analysis device digital processing device/ECU 400.

As indicated herein, the fluid system 240 or piping portion 201 further includes a temperature sensing device 220 that is arranged in the fluid system so that the temperature sensing device measures a temperature of the flowing fluid and so the temperature sensing device provides an output of the measured temperature.

More particularly, the temperature sensing device 220 is operably or communicatively coupled to the signal analysis device digital processing device/ECU 400 so that measured temperature output(s) are provided to the signal analysis device digital processing device/ECU. In addition, the signal analysis device digital processing device/ECU is configured and arranged to process the outputs of the measured temperature, absolute pressure and differential pressure and to determine a mass flow rate of the flowing fluid in the fluid system portion.

Although a preferred embodiment of the invention has been described using specific terms, such description is for illustrative purposes only, and it is to be understood that changes and variations may be made without departing from the spirit or scope of the following claims.

INCORPORATION BY REFERENCE

All patents, published patent applications and other references disclosed herein are hereby expressly incorporated by reference in their entireties by reference.

EQUIVALENTS

Those skilled in the art will recognize, or be able to ascertain using no more than routine experimentation, many equivalents of the specific embodiments of the invention described herein. Such equivalents are intended to be encompassed by the following claims.

What is claimed is:

1. A method for measuring absolute and differential pressure of a flowing fluid in a fluid system, comprising the step(s) of:
   configuring the fluid system so as to include a first pressure tap and a second pressure tap that are spaced from each other such that the second pressure tap is downstream of the first pressure tap in a direction of flow;
   providing an absolute pressure sense element and first fluidly coupling the absolute pressure sense element to one of the first or second pressure tap so as to thereby measure an absolute pressure representative of the flowing fluid at the respective pressure tap to which it is fluidly coupled;
   providing a differential pressure sense element and second fluidly coupling the differential pressure sense element to each of the first and second pressure taps so as to measure a differential pressure of the flowing fluid between the first and second pressure taps; and
   wherein said first and second fluidly coupling further includes disposing a non-compressible medium between the respective absolute and differential pressure sense elements and the respective first and second pressure taps.

2. The method of claim 1, wherein said first fluidly coupling further includes fluidly coupling the absolute pressure sense element to the first pressure tap so as to thereby measure an absolute pressure representative of the flowing fluid at the first pressure tap location.

3. The method of claim 1, further comprising the step of providing a fluid channel between the second pressure tap and the differential pressure sense element the fluid channel containing the non-compressible medium, the fluid channel being configured and arranged so as to communicate a second pressure representative of the flowing fluid at the second pressure tap location to the differential pressure sense element.

4. The method of claim 3, further comprising the step of communicating a first pressure representative of the flowing fluid at the first pressure tap location to the differential pressure sense element.

5. The method of claim 1, further comprising the step(s) of:
   locating a restrictive pressure device in the fluid system disposed between the first and second pressure taps such that the first pressure tap is at a higher pressure than the second pressure tap.

6. The method of claim 5, wherein the restrictive pressure device is one of a restrictive venturi, an orifice or a throttle plate.

7. The method of claim 1, further comprising the step(s) of:
   providing at least one digital processing mechanism;
   wherein each of the at least one digital processing mechanism is configured and arranged for controlling operation of the absolute pressure sense element and controlling operation of the differential pressure sense element; and
   wherein each of the at least one digital processing mechanism is configured and arranged for providing an output representative of the absolute pressure being measured and for providing an output representative of the differential pressure being measured.

8. The method of claim 7, wherein each of the at least one digital processing mechanism is an ASIC.

9. The method of claim 7, wherein:
   said providing at least one digital processing mechanism includes providing a first digital processing mechanism and a second digital processing mechanism;
   the first digital processing mechanism is configured and arranged for controlling operation of the absolute pressure sense element and for providing an output representative of the absolute pressure being measured; and the second digital processing mechanism is configured and arranged for controlling operation of the differential pressure sense element and for providing an output representative of the differential pressure being measured.

10. The method of claim 1, wherein the flowing fluid is a gas and wherein the method further comprises the step(s) of:

providing a temperature sensing device and configuring the fluid system so that the temperature sensing device measures a temperature of the flowing gas and provides an output of the measured temperature, wherein the absolute pressure sense element provides an output of the measured absolute pressure and the differential pressure sense element provides an output of the measured differential pressure; and using the outputs of the measured temperature, absolute pressure and differential pressure to determine a mass flow rate of the flowing gas in the fluid system.

11. The method of claim 1, wherein each of the absolute pressure sense element and the differential pressure sense element comprise a MEM sense element.

12. The method of claim 1, wherein the flowing fluid is one of an exhaust gas of an exhaust gas recirculation system or intake air of an intake system.

13. A method for determining a mass flow rate of a flowing gas in a fluid system, comprising the step(s) of:

configuring the fluid system so as to include a first pressure tap, a second pressure tap, a restrictive pressure device and a temperature sensing device;

wherein the first and second pressure taps are spaced from each other such that the second pressure tap is downstream of the first pressure tap in a direction of flow;

wherein the restrictive pressure device is disposed between the first and second pressure taps such that the first pressure tap is at a higher pressure than the second pressure tap;

wherein the temperature sensing device is coupled to and arranged in the fluid system so that the temperature sensing device measures a temperature of the flowing gas and provides an output of the measured temperature;

providing an absolute pressure sense element and first fluidly coupling the absolute pressure sense element to one of the first or second pressure taps so as to thereby measure an absolute pressure representative of the flowing gas at the respective pressure tap to which it is fluidly coupled and providing an output thereof;

providing a differential pressure sense element and second fluidly coupling the differential pressure sense element to each of the first and second pressure taps so as to measure a differential pressure of the flowing gas between the first and second pressure taps and providing an output thereof;

wherein said first and second fluidly coupling further includes disposing a non-compressible medium between the respective absolute and differential pressure sense elements and the respective first and second pressure taps; and using the outputs of the measured temperature, absolute pressure and differential pressure to determine a mass flow rate of the flowing gas in the fluid system.

14. The method of claim 13, wherein the flowing gas is one of an exhaust gas of an exhaust gas recirculation system or intake air of an intake system both of an internal combustion engine.

15. An apparatus for measuring absolute and differential pressure of a flowing fluid in a fluid system, comprising:

a housing including a plurality of cavities that are fluidly coupled in spaced relation to the fluid system and so as to be fluidly coupled to the flowing fluid;

a sensing module mounted to the housing; and wherein the sensing module includes:

an absolute pressure sense element that is first fluidly coupled to one of the plurality of cavities so as to thereby measure an absolute pressure representative of the flowing fluid to which the said one cavity is fluidly coupled to, a differential pressure sense element that is second fluidly coupled to said one cavity and to another of the plurality of cavities so the differential pressure sense element measures a differential pressure of the flowing fluid to which said first and another cavities are fluidly coupled to, and a non-compressible medium being disposed in said one cavity and said another cavity so that the non-compressible medium is located between the respective absolute and differential pressure sense elements and the flowing fluid to isolate the sense elements from the flowing fluid while allowing the sense elements to be responsive to the pressure of the flowing fluid.

16. The apparatus of claim 15, wherein said sensing module further includes a fluid channel that is arranged so as to be fluidly coupled between the another cavity and the differential pressure sense element, the fluid channel containing the non-compressible medium, the fluid channel being configured and arranged so as to communicate a second pressure representative of the flowing fluid at the another cavity location to the differential pressure sense element.

17. The apparatus of claim 15, wherein the absolute pressure sensing element and the differential pressure sense element are disposed in said one cavity.

18. The apparatus of claim 15, wherein the fluid system includes a restrictive pressure device and wherein the housing is arranged so that said one cavity and said another cavity are disposed upstream and downstream of the restrictive pressure device in a direction of the flowing fluid.

19. The apparatus of claim 18, wherein the restrictive pressure device is one of a restrictive venturi, an orifice or a throttle plate.

20. The apparatus of claim 15, further comprising:

at least one digital processing mechanism;

wherein each of the at least one digital processing mechanism is configured and arranged for controlling operation of the absolute pressure sense element and controlling operation of the differential pressure sense element; and wherein each of the at least one digital processing mechanism is configured and arranged for providing an output representative of the absolute pressure being measured and for providing an output representative of the differential pressure being measured.

21. The apparatus of claim 20, wherein each of the at least one digital processing mechanism is an ASIC.

22. The apparatus of claim 20, further comprising:

a temperature sensing device that is coupled to the housing so that the temperature sensing device measures a temperature of the flowing fluid and so the temperature sensing device provides an output of the measured temperature.

23. The apparatus of claim 20, wherein the flowing fluid is a gas and wherein the apparatus further comprises:
a third digital processing device; wherein each of the first and second digital processing mechanisms and the temperature sensing device are operably coupled to a third digital processing device and wherein the third digital processing device is configured and arranged so the outputs of the measured temperature, absolute pressure and differential pressure are used to determine a mass flow rate of the flowing gas in the fluid system.

24. The apparatus of claim 15, wherein each of the absolute pressure sense element and the differential pressure sense element comprise a MEM sense element.

25. The apparatus of claim 15, wherein the flowing fluid is one of an exhaust gas of an exhaust gas recirculation system or intake air of an intake system.

\* \* \* \* \*